(12) United States Patent
Ishida

(10) Patent No.: US 11,155,175 B2
(45) Date of Patent: Oct. 26, 2021

(54) VEHICLE CHARGING APPARATUS

(71) Applicant: Mitsubishi Electric Corporation, Tokyo (JP)

(72) Inventor: Yoshikazu Ishida, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 368 days.

(21) Appl. No.: 16/284,459

(22) Filed: Feb. 25, 2019

(65) Prior Publication Data
US 2019/0344677 A1   Nov. 14, 2019

(30) Foreign Application Priority Data

May 8, 2018 (JP) .............................. JP2018-089735

(51) Int. Cl.
   *B60L 53/18* (2019.01)
   *B60L 53/60* (2019.01)
   *B60L 53/16* (2019.01)

(52) U.S. Cl.
   CPC .............. *B60L 53/18* (2019.02); *B60L 53/16* (2019.02); *B60L 53/60* (2019.02); *B60L 2240/547* (2013.01)

(58) Field of Classification Search
   CPC ....................................................... B60L 53/18
   USPC ....................................................... 320/109
   See application file for complete search history.

(56) References Cited

U.S. PATENT DOCUMENTS

| | | | |
|---|---|---|---|
| 2010/0079105 A1* | 4/2010 | Iwanaga | B60W 20/13 320/109 |
| 2013/0069425 A1* | 3/2013 | Kanazawa | B60L 3/0069 307/9.1 |
| 2014/0035512 A1 | 2/2014 | Kamachi | |
| 2014/0203634 A1* | 7/2014 | Sugiyama | B60L 50/61 307/10.1 |
| 2014/0232182 A1* | 8/2014 | Kinomura | B60L 53/16 307/10.1 |
| 2015/0375621 A1* | 12/2015 | Ono | B60L 50/16 307/10.1 |

FOREIGN PATENT DOCUMENTS

JP   2014-030283 A   2/2014

* cited by examiner

*Primary Examiner* — Jerry D Robbins
(74) *Attorney, Agent, or Firm* — Sughrue Mion, PLLC; Richard C. Turner

(57) ABSTRACT

When energization drive is applied to a connection detection transistor connected with an auxiliary battery, a power-supply opening/closing device is closed through a relaying connection device; a microprocessor in a charge control apparatus starts its operation through a stabilized power source; then, the resistance value of a first resistor is calculated based on respective measurement voltages at related points, which are inputted to a multi-channel A/D converter, so that the type of a charging cable is detected.

18 Claims, 12 Drawing Sheets

| R904 | 400 | 600 | 800 | 1000 | 1200 |
|---|---|---|---|---|---|
| R905 | 1600 | 1600 | 1600 | 1600 | 1600 |
| R145b | 1500 | 1500 | 1500 | 1500 | 1500 |
| V1/V2 | 0.571 | 0.595 | 0.615 | 0.634 | 0.651 |

| R904 | 400 | 600 | 800 | 1000 | 1200 |
|---|---|---|---|---|---|
| R905 | 0 | 0 | 0 | 0 | 0 |
| R145b | 1500 | 1500 | 1500 | 1500 | 1500 |
| V1/V2 | 0.211 | 0.286 | 0.348 | 0.400 | 0.444 |

VEHICLE CHARGING APPARATUS

BACKGROUND

Field of the Invention

The present application relates to a vehicle charging apparatus for charging a vehicle battery, which supplies electric power to a vehicle traveling motor, from a ground power source through a charging cable.

Description of the Related Art

In an electric vehicle such as an electric automobile or a hybrid vehicle, there has widely spread a normal-charging-method charge control apparatus that charges a vehicle battery by directly utilizing an AC power source, which is a commercial power source for a general home.

For example, Patent Document 1 discloses an electric-vehicle external power supply apparatus in which in a charging gun to be connected to the normal charging inlet of a vehicle, resistors R6 and R7 are connected in series with each other, in which the resistor R7 is connected in parallel with a switch S3 that is opened by pressing the lock release button of the charging gun, and in which in the vehicle, voltage dividing resistors R4 and R5, across which a reference voltage is applied, are connected with each other.

When the charging gun is connected to the normal charging inlet, the series resistors R6 and R7 are connected in parallel with the voltage dividing resistor R5; thus, through vehicle-side monitoring of the voltage of a connection signal Sg3, which is a voltage obtained through division by the voltage dividing resistors R4 and R5, it is made possible to detect whether or not the charging gun is connected to the normal charging inlet and whether or not the switch S3 is closed. Moreover, it is argued that by changing the values of the resistors R6 and R7 in the charging gun, it is made possible to detect the type of the charging gun.

PRIOR ART REFERENCE

Patent Document

[Patent Document 1] Japanese Patent Application Laid-Open No. 2014-30283 (FIG. 4 and Paragraphs 0032 and 0033)

The external power supply apparatus disclosed in Patent Document 1 makes it possible to perform normal charging from a household power source by use of a simple charging cable; however, in order to detect whether or not a connection state has occurred, it is required that generation of the reference voltage and the monitoring circuit for the connection signal are made to be effective, even when the charging cable is not connected to the normal charging inlet; thus, in particular, there has been a problem that when in order to determine the types of diverse charging cables, a high-accuracy monitoring circuit is utilized, the power consumption in the vehicle battery increases.

The present application has been implemented in order to solve the foregoing problem; the objective thereof is to provide a vehicle charging apparatus that suppresses the power consumption in a vehicle battery at a time when no charging cable is connected and that can distinguish and detect diverse charging cables.

SUMMARY OF THE INVENTION

A vehicle charging apparatus according to the present application includes a vehicle electric-power conversion apparatus that includes a driving electric power conversion circuit that supplies driving electric power from a main battery mounted in a vehicle to a traveling motor, by way of a traveling contactor; a charging electric power conversion circuit that charges the main battery by way of vehicle charging contactors to be connected with a charging cable connected with an outer-vehicle power source or by way of a charging-system contactor including a pair of series contactors formed of the vehicle charging contactors and the traveling contactors; a charging start control circuit that detects a connection state of the charging cable and performs opening/closing control of the charging contactor provided in a charging path for the main battery, Wherein the vehicle electric-power conversion apparatus is supplied with controlling electric power from an auxiliary battery that is charged from the main battery by way of the traveling contactors and a step-down charging apparatus, wherein the charging cable includes
a power-receiving plug to be connected with the power source outside the vehicle,
a power-supply plug that is connected with the power-receiving plug by way of a pair of power-source lines and that is inserted into the vehicle-side charging plug,
a lock switch that performs circuit-closing operation or circuit-opening operation when the power-supply plug is completely inserted into the charging plug and hence the disconnection-preventing lock mechanism works,
a first resistor having a resistance value corresponding to each of charging cables of two or more types that differ from one another in the difference of a maximum charging current, and
a second resistor that is connected in series with the first resistor and is connected in parallel with the lock switch,
wherein when the lock release button is pressed, the lock switch becomes inoperative, and while the power-supply plug is disconnected, the lock switch becomes inoperative in circuit-opening or circuit-closing,
wherein a series circuit consisting of the first resistor and the second resistor is connected with the charging plug from the power-supply plug through a signal terminal,
wherein the charging start control circuit includes
a stabilized power source that is supplied with electric power by the auxiliary battery by way of power-supply opening/closing device so as to generate a predetermined first stabilized voltage,
a charge control apparatus that undergoes power-supply driving by the stabilized power source so as to control the charging electric power conversion circuit,
a connection detection transistor that is supplied with electric power by the auxiliary battery so as to undergo circuit-closing driving by way of the series circuit consisting of the first resistor and the second resistor,
the power-supply opening/closing device that undergoes circuit-closing driving when the connection detection transistor is closed, and
a multi-channel A/D converter, to which a voltage proportional to a voltage to be applied to the series circuit consisting of the first resistor and the second resistor is inputted, and
wherein in the multi-channel A/D converter, the stabilized voltage is utilized as the driving voltage for the multi-channel A/D converter and as the reference voltage for AD conversion,
wherein the charge control apparatus includes a microprocessor; when a digital signal generated from the multi-channel A/D converter is inputted to the microprocessor, the microprocessor determines the resistance value of the first resistor and the opening/closing state of the lock switch; when the power-supply plug has completely been inserted into the charging plug and the lock switch works, the microprocessor performs circuit-closing driving of the charging-system contactor and implements charging; when the lock switch becomes inoperative, the microprocessor stops driving of the charging-system contactor even when the charging has not been completed.

The vehicle charging apparatus according to the present application makes it possible that the connection state of the charging cable is detected and then the stabilized power source is started; thus, there is demonstrated an effect that the power consumption in the auxiliary battery at a time when the vehicle is parked can be suppressed. Moreover, when the stabilized power source is started, the microprocessor is made to operate and the resistance value of the charging cable can accurately be measured; thus, there is demonstrated an effect that diverse charging cables can be detected in a distinguishing manner.

The foregoing and other object, features, aspects, and advantages of the present invention will become more apparent from the following detailed description of the present invention when taken in conjunction with the accompanying drawings.

BRIEF DESCRIPTION OF THE DRAWINGS

FIG. 3A is a circuit diagram representing a voltage detection unit in the vehicle charging apparatus according to Embodiment 1;

FIG. 3B is a table representing a list of voltage detection characteristics at a time when a lock switch in FIG. 3A is off;

FIG. 3C is a table representing a list of voltage detection characteristics at a time when the lock switch in FIG. 3A is on;

DETAILED DESCRIPTION OF THE PREFERRED EMBODIMENTS

Embodiment 1

Hereinafter, a vehicle charging apparatus according to Embodiment 1 of the present application will be explained based on FIGS. 1 through 4.

Figure 1:
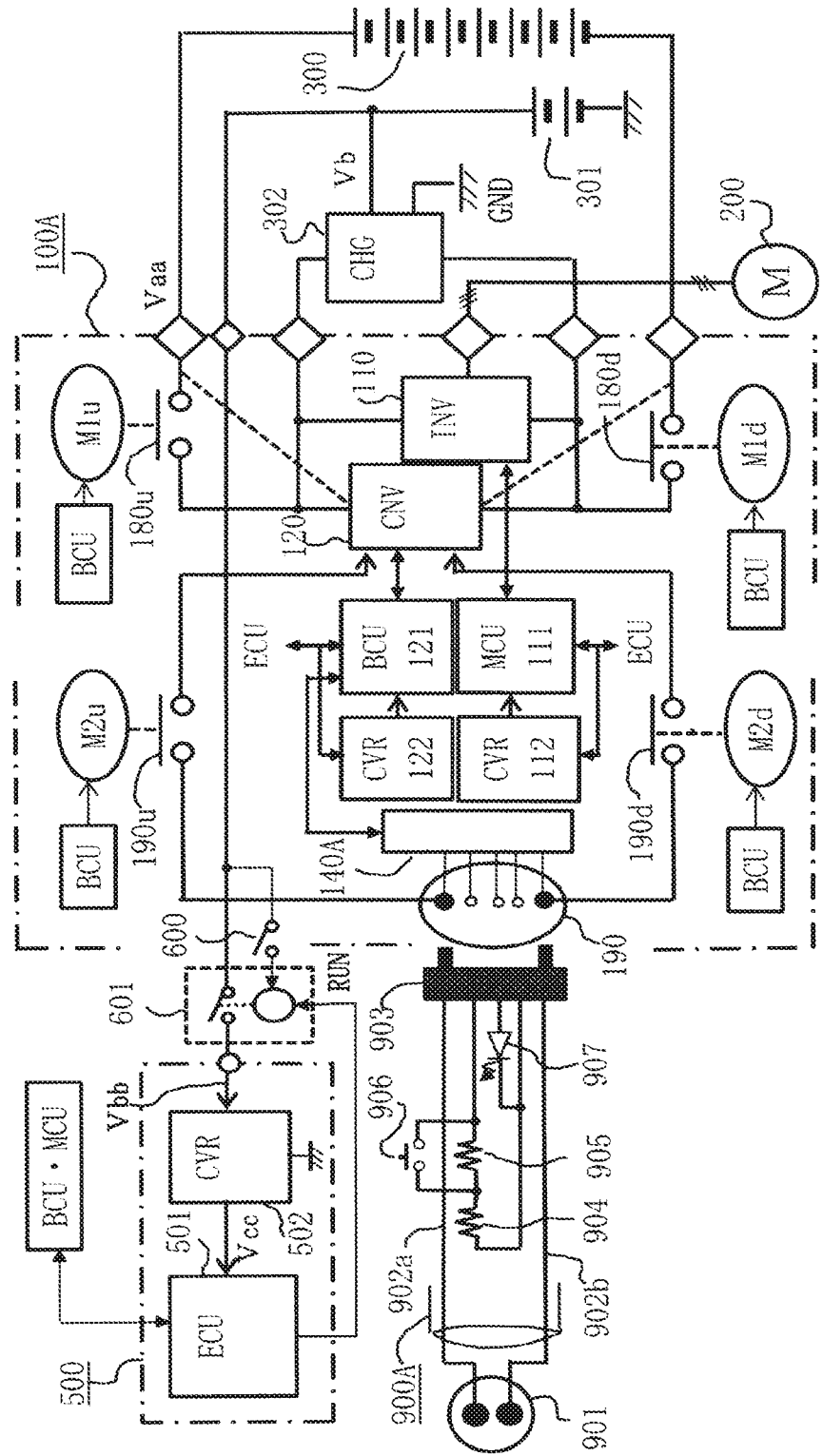
FIG. 1 is a whole-circuitry block diagram representing a vehicle charging apparatus according to Embodiment 1.

In FIG. 1, a vehicle electric-power conversion apparatus 100A is connected with a traveling motor 200 that is supplied with electric power and is driven by a main battery 300 that generates a main power source voltage Vaa of, for example, DC 400V, by way of an inverter (abbreviated as INV) 110, and the vehicle electric-power conversion apparatus 100A is also connected, with an auxiliary battery 301 that is charged by the main battery 300, by way of an isolated step-down charging apparatus (abbreviated as CHG) 302, and generates an auxiliary battery voltage Vb of, for example, DC 12V; furthermore, the vehicle electric-power conversion apparatus 100A is connected with a ground commercial power source by way of a charging cable 900A.

When a power-source switch 600 of the vehicle is closed, a higher-hierarchy control apparatus 500 including a calculation control apparatus 501 is supplied with the auxiliary battery voltage Vb by way of a power source relay 601 and then is supplied with electric power by way of a stabilized power source (abbreviated as CVR) 502 that generates a stabzed voltage Vcc of, for example, DC 5V; when a microprocessor (abbreviated as ECU), which is a main element of the calculation control apparatus 501, is supplied with the stabilized voltage Vcc and generates a normal operation signal RUN, the operational state of the power source relay 601 is maintained even when the power-source switch 600 is opened.

Then, when the power-source switch 600 is opened, the microprocessor ECU of the calculation control apparatus 501 performs stopping control of the vehicle, stores storage information such as driving history information, and then stops its control operation, so that due to the stoppage of the normal operation signal RUN, the power source relay 601 is opened.

The charging cable 900A is provided with a power-receiving plug 901 to be connected to a power source outside the vehicle and a power-supply plug 903 to be connected with the power-receiving plug 901 through a pair of power-source lines 902a and 902b and to be inserted into a vehicle-side charging plug 190; based on the difference in the maximum charging current, two or more charging cables of different types are utilized.

The charging cable 900A is further provided with a lock switch 906 that closes or opens when the power-supply plug 903 is completely inserted into the charging plug 190 and hence an unillustrated disconnection-preventing lock mechanism works, a first resistor 904 having a resistance value corresponding to each of two or more charging cables of different types, and a second resistor 905 that is connected in series with the first resistor 904 and is connected in parallel with the lock switch 906.

The lock switch 906 becomes inoperative when an unillustrated lock release button is pressed; when the power-supply plug 903 is disconnected, the lock switch 906 is in the inoperative state of being opened or closed; the series circuit consisting of the first resistor 904 and the second resistor 905 is connected from the power-supply plug 903 to the charging plug 190 through the signal terminals.

The power-supply plug 903 is provided with a cable-side power-source indicator 907, which is an LED, for example; when the charging cable 900A is connected, a lighting control circuit 147a, described later in FIG. 2, performs blinking display or lighting display of the cable-side power-source indicator 907.

The driving electric power conversion circuit (abbreviated as INV) 110, which is a main element of the vehicle electric-power conversion apparatus 100A, has three pairs of upstream switching devices and downstream switching devices that form an unillustrated three-phase full wave bridge circuit; each of the respective series connection points thereof is connected with the traveling motor (abbreviates as M) 200, which is a three-phase synchronous motor; the series upstream terminal thereof is connected with the positive-polarity terminal of the main battery 300 by way of an upstream traveling contactor 180u; the series downstream terminal thereof is connected with the negative-polarity terminal of the main battery 300 by way of a downstream traveling contactor 180d.

A motor control apparatus 111 that collaborates with the driving electric power conversion circuit 110 is provided with a motor-control microprocessor MCU that performs serial communication of control and monitoring signals with the higher-hierarchy control apparatus 500 and is provided with a stabilized power source (abbreviated as CVR) 112 that is supplied with electric power by the auxiliary battery 301 so as to generate the stabilized voltage Vcc and to supply electric power to the motor-control microprocessor MCU.

Meanwhile, by way of a pair of charging contactors 190u and 190d, an AC voltage to be connected with the ground power source via the charging cable 900A is inputted to a charging electric power conversion circuit (abbreviated as CNV) 120 added to the vehicle electric-power conversion apparatus 100A; the charging electric power conversion circuit 120 is a variable-output-voltage DC voltage generation circuit for rectifying the inputted AC voltage and generating an electrically insulated DC output voltage so as to charge the main battery 300.

A charge control apparatus 121 that collaborates with the charging electric power conversion circuit 120 is provided with a charge-control microprocessor BCU that performs serial communication of control and monitoring signals with the higher-hierarchy control apparatus 500 and is provided with a stabilized power source (abbreviated as CVR) 122 that is supplied with electric power by the auxiliary battery 301 so as to generate the stabilized voltage Vcc and to supply electric power to the charge-control microprocessor BCU; while monitoring a charging current for the main battery 300, the charge-control microprocessor BCU performs van able control of the DC output voltage.

The output voltage of the charging electric power conversion circuit 120 can be connected with the main battery 300 via the pair of traveling contactors 180u and 180d or can directly be connected with the main battery 300 as illustrated by dotted lines.

The charge-control microprocessor BCU can perform separate circuit-closing driving of electromagnetic coils M1u and M1d for energizing the upstream and downstream traveling contactors 180u and 180d, respectively, and electromagnetic coils M2u and M2d for energizing the pair of charging contactors 190u and 190d, respectively.

Figure 2:
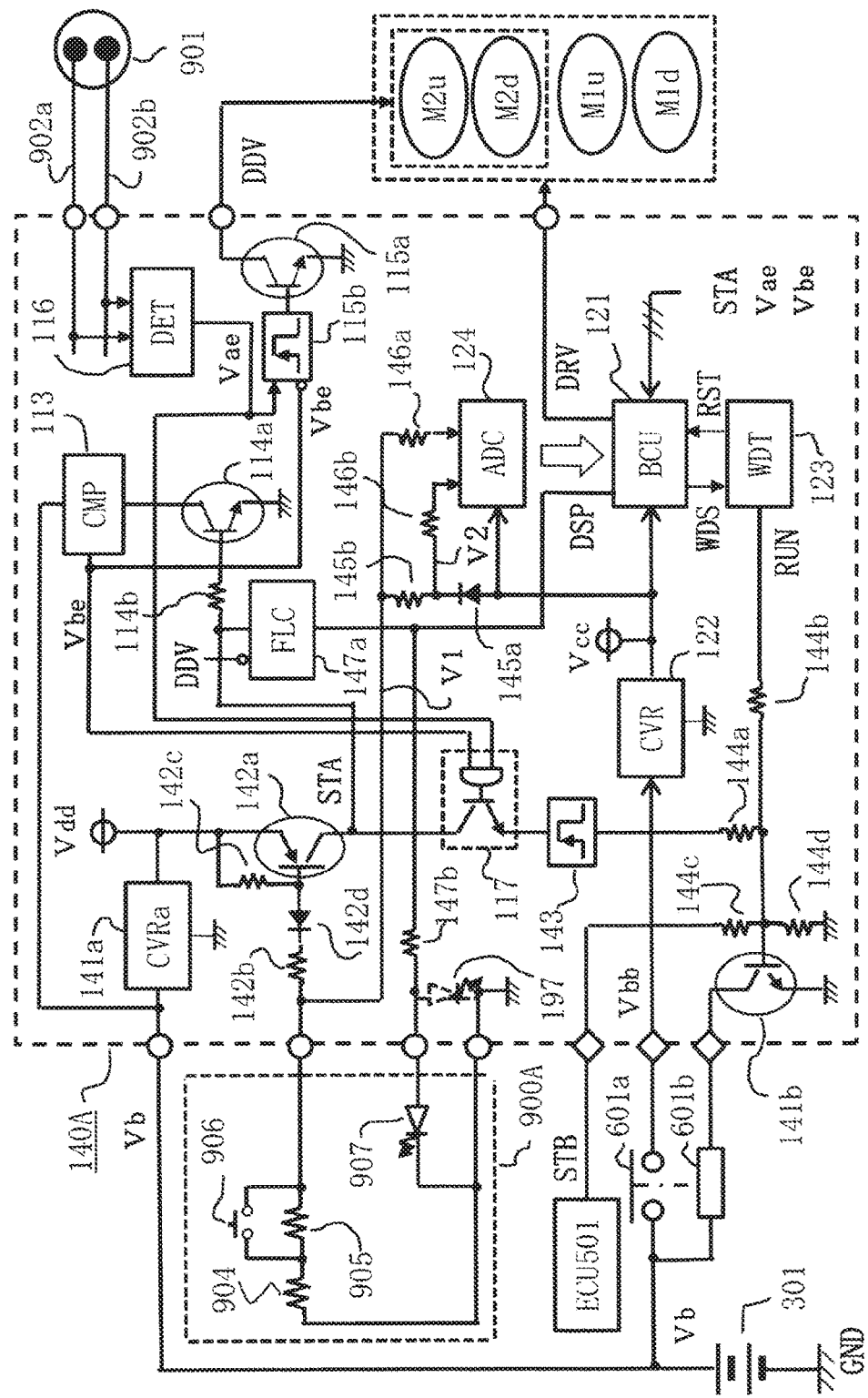
FIG. 2 is a circuit configuration diagram mainly representing a charging start control circuit to be utilized in the vehicle charging apparatus according to Embodiment 1.

In response to the state of connection between the power-supply plug 903 and the charging plug 190, the charging start control circuit 140A, described in detail in FIG. 2, collaborates with the charge control apparatus 121 so as to perform opening/closing control of the pair of charging contactors 190u and 190d or a charging-system contactor, which is a pair of series contactors in which the pair of charging contactors 190u and 190d or the pair of traveling contactors 180u and 180d are connected in series with each other. The pair of charging contactors 190u and 190d to be connected in series with each other is provided at the input side of the charging electric power conversion circuit 120, as represented in FIG. 1, or can be provided at an unillustrated output side.

Next, the configuration of FIG. 2, which is a detailed circuit diagram mainly representing the charging start control circuit 140A represented in FIG. 1, be explained in detail.

At first, in FIG. 2, the charging start control circuit 140A is provided with an auxiliary constant voltage power source 141a that generates an auxiliary stabilized voltage Vdd of, for example, DC 5V when the auxiliary stabilized battery voltage Vb, which is the output voltage of the auxiliary battery 301 of, for example, DC 12V, is directly applied to it, a stabilized power source 122 that generates a stabilized voltage Vcc of, for example, DC 5V when a secondary power source voltage Vbb is applied to it via a power-supply opening/closing device 601a from the auxiliary battery 301, and the charge control apparatus 121 that operates based on the stabilized voltage Vcc.

The power-supply opening/closing device 601a is described as an electromagnetic relay that closes when a driving device 601b, which is, for example, an excitation coil, is energized; however, it is also made possible that the electromagnetic relay is replaced by a non-contact one utilizing a field-effect transistor and is provided inside the charging start control circuit 140A.

The auxiliary stabilized voltage Vdd is applied to the emitter terminal of a connection detection transistor 142a, which is a PNP-junction transistor; the base terminal thereof is connected with the vehicle body ground circuit GND by way of a diode 142d, a base resistor 142b, and the second resistor 905 and the first resistor 904 in the charging cable 900A; an opening-circuit stabilizing resistor 142c is connected between the emitter terminal and the base terminal.

The collector terminal of the connection detection transistor 142a that generates a connection detection signal STA performs energizing drive of the driving device 601b by way of a starting prohibition circuit 117, a driving time limiting circuit 143, an initial starting resistor 144a, and a relaying connection device 141b.

As a result, when the power-supply opening/closing device 601a closes, the microprocessor BCU of the charge control apparatus 121 receives the stabilized voltage Vcc and hence starts to operate so as to generate a watchdog signal WDS; when a watchdog timer 123 that responds to the watchdog signal WDS generates the normal operation signal RUN, the power-supply opening/closing device 601a performs self-holding operation by way of a holding start resistor 144b and the relaying connection device 141b.

In this regard, however, when due to abnormal operation of the microprocessor BCU of the charge control apparatus 121, the pulse width of the watchdog signal WDS exceeds a predetermined value, the watchdog timer 123 stops the generation of the normal operation signal RUN so that the self-holding operation of the power-supply opening/closing device 601a is released; concurrently, the watchdog timer 123 generates a reset signal RST so as to initialize the microprocessor BCU of the charge control apparatus 121.

An open-circuit stabilizing resistor 144d is connected between the base and emitter terminals of the relaying connection device 141b, which is an NPN-junction transistor; it is also made possible that when the charging cable 900A is disconnected and the power-source switch 600 is closed in order to drive the vehicle, a starting command signal STB generated by the calculation control apparatus 501 performs circuit-closing driving of the relaying connection device 141b by way of a driving start resistor 141c so that the power-supply opening/closing device 601a is closed.

The starting prohibition circuit 117, described above, turns on when each of the respective logics of a DC voltage detection signal Vbe generated by the lower limit voltage detection circuit 113 and an AC voltage detection signal Vae generated by the AC voltage detection circuit 116 is a predominant logic, for example, "H"; in a predetermined time period after both the connection detection transistor 142a and the starting prohibition circuit 117 have closed, the driving time limiting circuit 143 becomes closed and can continue to perform circuit-closing driving of the power-supply opening/closing device 601a at least until the normal operation signal RUN is generated.

The AC voltage detection circuit 116 is to generate the electrically insulated AC voltage detection signal Vae by means of, for example, a photo-coupler when an AC power source voltage obtained from the power-receiving plug 901 in FIG. 1 by way of the power-supply plug 903, the power-source lines 902a and 902b, and the charging plug 190 is the same as or larger than a predetermined threshold-value AC voltage; the threshold-value AC voltage in this explanation is a voltage that is the same as or larger than a minimum AC power source voltage with which the foregoing step-down charging apparatus 302 can charge the auxiliary battery 301.

A lower limit voltage detection circuit 113 is a comparison circuit that operates when the connection detection transistor 142a is closed and generates the DC voltage detection signal Vbe when the auxiliary battery voltage Vb is the same as or larger than a predetermined threshold-value DC voltage. The predetermined threshold-value DC voltage in this explanation is a voltage between a second voltage Vb2 (e.g., DC 7V) of the auxiliary battery voltage Vb, which is required for the stabilized power source 122 to generate the stabilized voltage Vcc (e.g., DC 5V), and a first voltage Vb1 (e.g., DC 6V) of the auxiliary battery voltage Vb, which is required for the stabilized power source 122 to generate a power-source reset voltage Vrst (e.g., DC 4.5V, Vrst<Vcc) for the microprocessor BCU of the charge control apparatus 121 (in this regard, however, Vb1<Vb2); the microprocessor BCU of the charge control apparatus 121 performs control operation at a power-source voltage that is the same as or larger than the power-source reset voltage Vrst.

The auxiliary battery voltage Vb is applied to the lower limit voltage detection circuit 113 by way of a connection detection device 114a; when the connection detection transistor 142a closes, the connection detection device 114a is driven to close, by way of a base resistor 114b.

A power supply diode 145a applies the stabilized voltage Vcc generated by the stabilized power source 122 to a series circuit consisting of the first resistor 904 and the second resistor 905 in the charging cable 900A, by way of a series power supply resistor 145b; a first measurement voltage V1 and a second measurement voltage V2, each of which is the voltage at one or the other terminal of the series power supply resistor 145b, are connected with the input terminals of a multi-channel A/D converter 124, by way of a high-resistance first input resistor 146a and a high-resistance second input resistor 146b, respectively.

The electromagnetic coils M1u, M1d, M2u, and M2d that are supplied with electric power and energized by a charging relay driving output DRV from the microprocessor BCU of the charge control apparatus 121 perform circuit-closing driving of the traveling contactors 180u and 180d and the charging contactors 190u and 190d, respectively, in FIG. 1; however, a direct power supply device 115a in FIG. 2 generates a direct charging command output DDV that energizes only the electromagnetic coils M2u and M2d for performing circuit-closing driving of the charging contactors 190u and 190d, respectively.

The direct power supply device 115a is represented as an NPN-junction transistor that undergoes circuit-closing driving by way of a charging time limiting circuit 115b.

In a time period before a predetermined limit time elapses after a time point when the logic level of the DC voltage detection signal Vbe from the lower limit voltage detection circuit 113 is "L" and the logic level of the AC voltage detection signal Vae from the AC voltage detection circuit 116 becomes "H", the logic level of the charging time limiting circuit 115b becomes "H"; then, the charging time limiting circuit 115b performs circuit-closing driving of the direct power supply device 115a.

Therefore, when the auxiliary battery voltage Vb abnormally decreases and an AC voltage to be obtained from the charging cable 900A exists, the electromagnetic coils M2u and M2d are energized under the condition that the microprocessor BCU of the charge control apparatus 121 does not work and hence the charging contactors 190u and 190d undergo circuit-closing driving; accordingly, the charging electric power conversion circuit 120 generates a predetermined DC voltage VDC obtained by electrically insulating and rectifying the inputted AC voltage.

The lighting control circuit 147a that is supplied with electric power and is driven by the connection detection transistor 142a is to perform lighting control of the cable-side power-source indicator 907 provided in the charging cable 900A, by way of a display driving resistor 147b; the cable-side power-source indicator 907 can be replaced by a vehicle-side power-source indicator 197.

The lighting control circuit 147a performs flickering or lighting driving of the power-source indicator 907 in such a way as to generate a low-frequency or narrow-width-pulse flickering output when the microprocessor BCU of the charge control apparatus 121 is inoperative and the connection detection transistor 142a is closed and in such a way as to generate a continuous-mode lighting output directly in response to the output of the direct charging command output DDV when the direct power supply device 115a is closed.

In contrast, the microprocessor BCU of the charge control apparatus 121 generates a display command DSP for performing power-supply driving of the power-source indicator 907; in the time period in which the connection detection transistor 142a is closed and the charging-system contactor is opened, the microprocessor BCU issues an intermittent operation command; in the time period in which circuit-closing driving is applied to the charging-system contactors, the microprocessor BCU generates an intermittent driving command signal, having a multi-step conduction duty rate or frequency, that responds to the charging state of the auxiliary battery 301.

In addition to the logic inputs such as the foregoing connection detection signal STA, the AC voltage detection signal Vae, and the DC voltage detection signal Vbe, the digital conversion values of a first analogue signal AN1 and a second analogue signal AN2 described later in FIGS. 3A, 3B, and 3C, as digital signals generated by the multi-channel A/D converter 124, the main power source voltage Vaa generated by the unillustrated main battery 300, and the digital conversion value of the value of a charging current for the main battery 300 are inputted to the microprocessor BCU of the charge control apparatus 121.

Figures 3A, 3B, 3C:
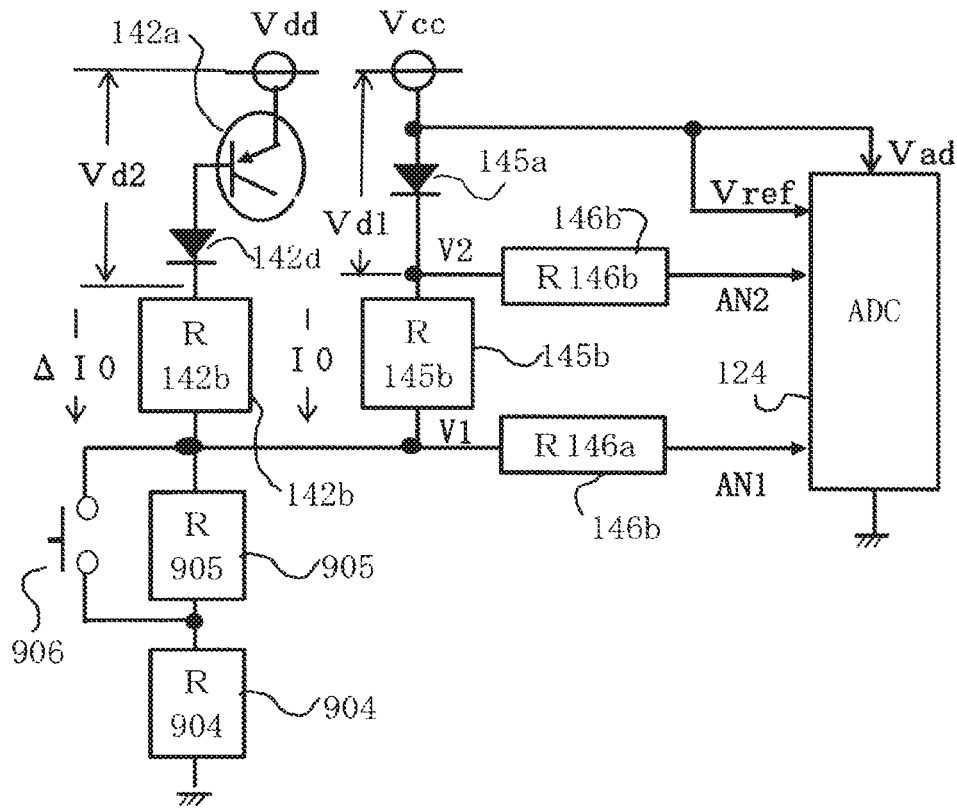

Next, the respective configurations of FIG. 3A, which is a local-portion detailed circuit diagram of the local portion showing the voltage detection unit represented in FIG. 2, FIG. 3B, which is a table representing voltage detection characteristics at a time when the lock switch in FIG. 3A is off, and FIG. 3C, which is a table representing voltage detection characteristics at a time when the lock switch in FIG. 3A is on, are sequentially explained in detail.

At first, in FIG. 3A, the first resistor 904 whose resistance value is R904 and the second resistor 905 whose resistance value is R905 are connected in series with each other; the auxiliary stabilized voltage Vdd of, for example, DC 5V generated by the auxiliary constant voltage power source 141a is applied across the first resistor 904 and the second resistor 905, by way of the diode 142d and the base resistor 142b, the resistance value of which is R142b, included in the base circuit of the connection detection transistor 142a.

The stabilized voltage Vcc of, for example, DC 5V generated by the stabilized power source 122 is applied across the series circuit consisting of the first resistor 904 and the second resistor 905, by way of the power supply diode 145a and the series power supply resistor 145b whose resistance value is R145b.

The first measurement voltage V1, which is the negative-side electric potential of the series power supply resistor 145b, is inputted, as the first analogue signal AN1, to the multi-channel A/D converter 124 by way of the first input resistor 140a whose resistance value is R146a.

The second measurement voltage V2, which is the positive-side electric potential of the series power supply resistor 145b, is inputted, as the second analogue signal AN2, to the multi-channel A/D converter 124 by way of the second input resistor 146b whose resistance value is R146b.

The stabilized voltage Vcc is applied, as a driving voltage Vad, to the power-source terminal of the multi-channel A/D converter 124; the stabilized voltage Vcc is also applied, as a reference voltage Vref, to the reference voltage terminal of the multi-channel A/D converter 124.

Accordingly, when the analogue input voltage to the multi-channel A/D converter 124 becomes equal to the stabilized voltage Vcc, which is the reference voltage Vref, the digital conversion value for the analogue input voltage becomes a maximum digital value that is determined by the resolution of the multi-channel A/D converter 124.

In this situation, letting I0 denote the current that flows into the series power supply resistor 145b due to the stabilized voltage Vcc and letting ΔI0 denote the current that flows into the base resistor 142b due to the auxiliary stabilized voltage Vdd, the relationships expressed by the equations (1) through (4) are established.

$$Vcc - V1 - Vd1 = I0 \times R145b \quad (1)$$

$$Vdd - V1 - Vd2 = \Delta I0 \times R142b \quad (2)$$

$$V2 - V1 = I0 \times R145b \quad (3)$$

$$V1 = (I0 + \Delta I0) \times (R905 + R904) = I0 \times (I + \Delta I0/I0) \times (R905 + R904) \quad (4)$$

In this regard, however, Vd1 is the falling voltage across the power supply diode 145a, and Vd2 is the addition value of the falling voltage between the emitter terminal and the base terminal of the connection detection transistor 142a and the falling voltage across the diode 142d.

When in the equations (1) and (2), the relationships [Vd2>Vd1, Vcc≈Vdd, and R142b>>R145b] are established, the equation (12) below is calculated.

$$\Delta I0/I0 = (R145b/R142b) \times (Vcc - V1 - Vd2)/(Vdd - V1 - Vd1) < (R145b/R142b) <<1 \quad (12)$$

Accordingly, the equation (5) below is obtained from the equations (3), (4), and (12).

$$R905 + R904 = \quad (5)$$
$$V1/[I0(1 + \Delta I0/I0)] = [R145b \times V1/(V2 - V1)]/(1 + \Delta I0/I0) \approx$$
$$R145b \times V1/(V2 - V1)$$

The equation (6) is obtained by modifying the equation (5).

$$V1/V2 \approx (R904 + R905)/(R904 + R905 + R145b) \quad (6)$$

In FIG. 3B, the table represents the change in the voltage ratio V1/V2 at a time when as an example, the resistance value R904 is set to any one of the values in five steps from 400Ω through 1200Ω and the resistance values R905, R145b, and R142b are set to 1600Ω, 1.5 kΩ, and 30 kΩ, respectively, while the lock switch 906 is opened.

In FIG. 3C, the table represents the change in the voltage ratio V1/V2 at a time when while the lock switch 906 is closed, the value the same as that in FIG. 3B is applied to the resistance value R904 and the resistance value R905 is 0Ω because the resistor 905 is short-circuited by the lock switch 906.

As evident from FIGS. 3B and 3C, calculation of the ratio of the first measurement voltage V1 to the second measurement voltage V2 makes it possible to determine the opening/closing state of the lock switch 906 and the resistance value R904 of the first resistor 904.

The respective digital conversion values of the first measurement voltage V1 and the second measurement voltage V2 are proportional to the reference voltage Vref applied to the reference voltage terminal of the multi-channel A/D converter 124, i.e., the stabilized voltage Vcc.

Accordingly, although when the auxiliary battery voltage Vb abnormally falls and hence the stabilized power source 122 cannot generate DC 5V, which is the target voltage thereof, the obtained digital voltage changes, V1/V2, which is the ratio between the both voltages, is substantially constant and does not undergo any effect of the change in the power-source voltage.

Hereinafter, the effect and the operation of the vehicle electric-power conversion apparatus 100A in the electric-vehicle charging apparatus according to Embodiment 1, configured as illustrated in FIGS. 1 through 3A, will be explained in detail.

At first, in FIGS. 1 and 2, when in the normal operation mode of the vehicle electric-power conversion apparatus 100A, the power-source switch 600 is closed, electric power is supplied to the calculation control apparatus 501 by way of the power source relay 601 and a stabilized power source 502 of the higher-hierarchy control apparatus 500 and hence the microprocessor ECU is started; after that, self-holding power supply is performed through the normal operation signal RUN generated by the microprocessor ECU and the starting command signal STB is generated so that electric power is supplied also to the stabilized power source 112 of the motor control apparatus 111 and the stabilized power source 122 of the charge control apparatus 121; then, each of the motor-control microprocessor MCU and the charge-control microprocessor ECU starts its control operation.

Then, the motor control apparatus 111 controls the driving electric power conversion circuit 110 so as to apply a variable-frequency three-phase pseudo-sine wave voltage to the traveling motor 200 so that power running is performed; when the vehicle is in the inertial traveling mode or in the descending-road traveling mode, the traveling motor 200 works as an electric power generator and the motor control apparatus 111 performs regenerative charge control of the main battery 300.

In this regard, however, when the charge control apparatus 121 detects the connection state of the charging cable 900A, this information is notified to the calculation control apparatus 501 via an unillustrated serial communication circuit and the microprocessor ECU of the calculation control apparatus 501 does not generate the starting command signal STB; thus, neither the motor-control microprocessor MCU nor the charge-control microprocessor ECU works based on the command from the microprocessor ECU.

In contrast, in the case where even when the power-source switch 600 is opened, it is detected that the charging cable 900A is connected by the charging start control circuit 140A, electric power is supplied to the stabilized power source 122 of the charge control apparatus 121 and hence the charge-control microprocessor ECU starts its control operation.

Figure 4A:
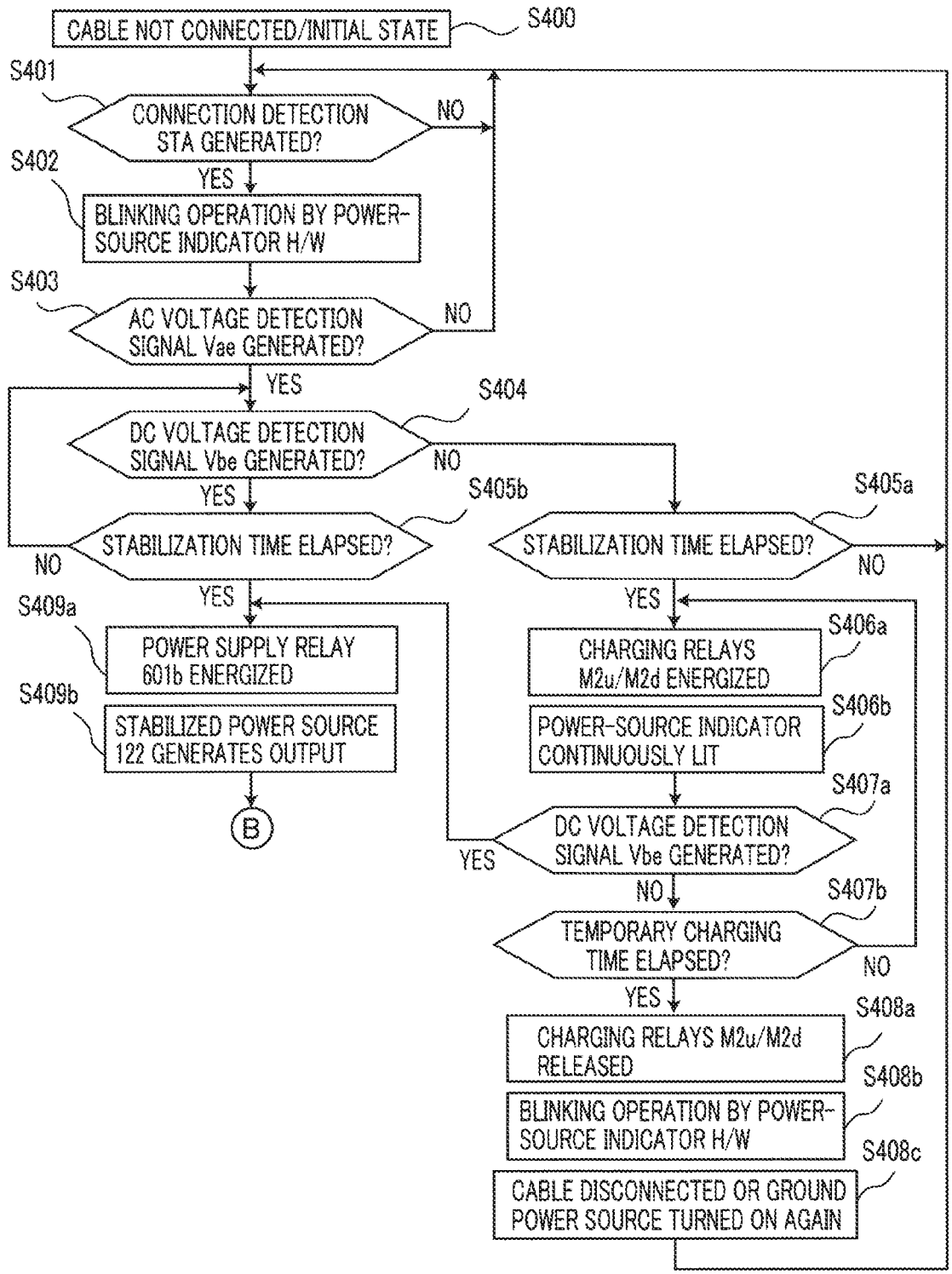
FIG. 4A is a diagram representing the first part of a flowchart for explaining the operation of the vehicle charging apparatus according to Embodiment 1.
Figure 4B:
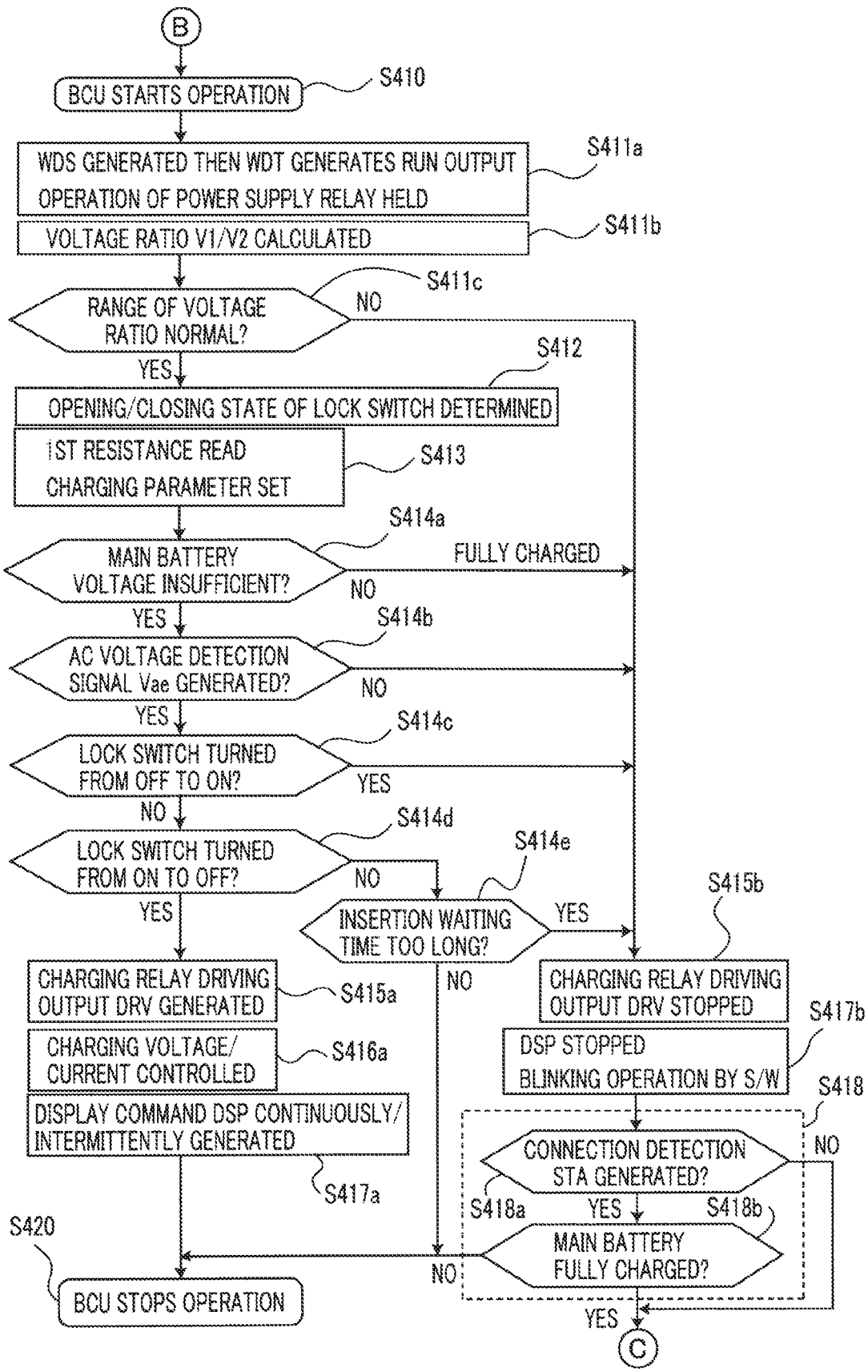
FIG. 4B is a diagram representing the second part of the flowchart for explaining the operation of the vehicle charging apparatus according to Embodiment 1.
Figure 4C:
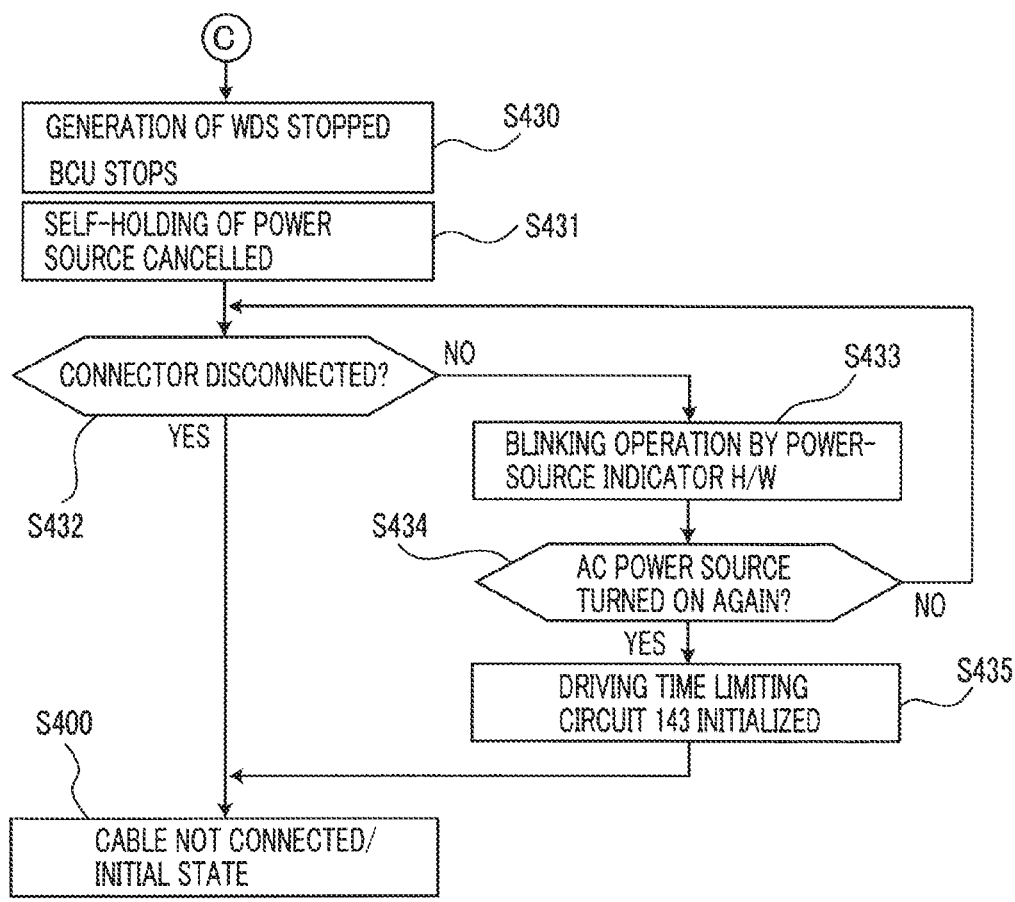
FIG. 4C is a diagram representing the third part of the flowchart for explaining the operation of the vehicle charging apparatus according to Embodiment 1.

Next, there will be sequentially explained in detail FIG. 4A, which is the front-stage portion of a flowchart for explaining the operation of the circuit configuration represented in FIG. 1 and which represents through the flowchart the control operation by the charging start control circuit 140A at a time before the charge-control microprocessor BCU operates, FIG. 4B, which is the middle-stage portion of the flowchart for explaining the operation of the circuit configuration represented in FIG. 1 and which represents through the flow chart the control operation by the charge-control microprocessor BCU itself, and FIG. 4C, which is the post-stage portion of the flowchart for explaining the operation of the circuit configuration represented in FIG. 1 and which represents through the flow chart the control operation when the charge-control microprocessor BCU stops its operation.

In FIG. 4A, the step S400 is the initial state where the power-source switch 600 is opened and the charging cable 900A is disconnected. The step S401 following the step S400 is a connection waiting step where it is determined whether or not the connection detection transistor 142a in FIG. 2 has been closed and hence the connection detection signal STA has been generated; in the case where connection of the charging cable 900 has been started, the result of the determination becomes "YES", and then, the step 401 is followed by the step S402; in the case where the connection detection signal STA has not been generated, the result of the determination becomes "NO", and then, the step S401 is resumed.

The step S402 is a step where the lighting control circuit 147a in FIG. 2 performs a short-time closing operation in a low-frequency manner so that the power-source indicator LED, which is the cable-side power-source indicator 907 or the vehicle-side power-source indicator 197, is on/off driven via the display driving resistor 147b.

In the step S403 following the step S402 s a waiting step where it is determined whether or not the AC voltage detection circuit 116 in FIG. 2 has generated the AC voltage detection signal Vae; in the case where the AC voltage detection circuit 116 in FIG. 2 has generated the AC voltage detection signal Vae, the result of the determination becomes "YES", and then, the step S403 is followed by the step S404; in the case where the AC voltage detection circuit 116 in FIG. 2 has not generated the AC voltage detection signal Vae, the result of the determination becomes "NO", and then, the step S401 is resumed.

The step S404 is a determination step where it is determined whether or not the lower limit voltage detection circuit 113 in FIG. 2 has generated the DC voltage detection signal Vbe; in the case where the lower limit voltage detection circuit 113 in FIG. 2 has generated the DC voltage detection signal Vbe, the result of the determination becomes "YES", and then, the step S404 is followed by the step S405b; in the case where the lower limit voltage detection circuit 113 in FIG. 2 has not generated the DC voltage detection signal Vbe, the result of the determination becomes "NO", and then, the step S404 is followed by the step S405a.

The step S405a is a determination step; the result of the determination becomes "NO" until awaiting time of, for example, 100 ms elapses and then the step S401 is resumed; in the case where even when the waiting time has elapsed, the DC voltage detection signal Vbe is not generated, the result of the determination becomes "YES", and the step S405a is followed by the step S406a.

In the step S406a, the direct power supply device 115a in FIG. 2 is closed and hence the electromagnetic coils M2u and M2d of a charging relay are energized; as a result, the charging contactors 190u and 190d in FIG. 1 undergo circuit-closing driving and then the generated DC voltage starts temporary charging of the auxiliary battery 301 by way of the step-down charging apparatus 302.

The step S406b following the step S406a is a step where due to the generation of the direct charging command output DDV in FIG. 2, the lighting control circuit 147a is in the continuous conduction mode and hence the cable-side power-source indicator 907 or the vehicle-side power-source indicator 197 is continuously lit.

The step S407a following the step S406b is a determination step where it is determined whether or not the lower limit voltage detection circuit 113 in FIG. 2 has generated the DC voltage detection signal Vbe; in the case where the lower limit voltage detection circuit 113 in FIG. 2 has generated the DC voltage detection signal Vbe, the result of the determination becomes "YES", and then, the step S407a is followed by the step S409a; in the case where the lower limit voltage detection circuit 113 in FIG. 2 has not generated the DC voltage detection signal Vbe, the result of the determination becomes "NO", and then, the step S407a is followed by the step S407b.

The step S407b is a determination step where it is determined whether or not a temporary charging period of, for example, several minutes has elapsed; in the case where the temporary charging period has not elapsed, the result of the determination becomes "NO", and then the step S406a is resumed and the temporary charging is continued; in the case where the temporary charging period has elapsed, the result of the determination becomes "YES", and then, the step S407b is followed by the step S408a.

The step S408a is a step where the direct power supply device 115a in FIG. 2 is opened and hence the electromagnetic coils M2u and M2d of the charging relay are deenergized, so that the charging contactors 190u and 190d in FIG. 1 are deenergized and opened, and hence the temporary charging of the auxiliary battery 301 is stopped.

The step S408b following the step S408a is a step where due to stoppage of the direct charging command output DDV in FIG. 2, the lighting control circuit 147a is in the blinking operation mode.

In the step S408c following the step S408b, the charging cable 900A is once disconnected and then is inserted again or the power-source switch of the ground power source is once turned off and then is turned on again, so that the step S401 is resumed and the temporary charging in the step S406a can be resumed.

The step S405b that follows the step S404 when the result of the determination in the step S404 becomes "YES" is a determination step; the result of the determination becomes "NO" until a waiting time of, for example, 100 ms elapses and then the step S404 is resumed; in the case where after the waiting time, the DC voltage detection signal Vbe is still generated, the result of the determination becomes "YES" and the step S405b is followed by the step S409a.

The step S409a is a step where the starting prohibition circuit 117 in FIG. 2 is closed and hence the driving device 601b of the power supply relay is energized by the auxiliary constant voltage power source 141a, via the connection detection transistor 142a, the starting prohibition circuit 117, the driving time limiting circuit 143, and the relaying connection device 141b; the step S409b following the step S409a is a step where the driving device 601b performs circuit-closing driving of the power-supply opening/closing device 601a and hence the stabilized power source 122 generates the stabilized voltage Vcc; the step S409b is followed by the step S410 in FIG. 4B via the relay terminal B.

In FIG. 4B, the step S410 is a step where the microprocessor BCU, which is the main element of the charge control apparatus 121, starts its control operation.

The step S411a is a step that becomes a power source control means as a power source controller where the microprocessor BCU of the charge control apparatus 121 generates the watchdog signal WDS, and then the watchdog timer 123 in FIG. 2, which responds to the watchdog signal WDS, generates the normal operation signal RUN so as to perform self-holding driving of the driving device 601b via the holding start resistor 144b and the relaying connection device 141b.

The watchdog timer 123 generates the reset signal RST when the pulse period of the watchdog signal WDS generated by the microprocessor BCU of the charge control apparatus 121 exceeds a predetermined value, and then initializes and restarts the microprocessor BCU.

The step S411b following the step S411a is a step where the ratio V1/V2 of the first measurement voltage V1 to the second measurement voltage V2 is calculated based on the ratio between the respective digital conversion values of the first analogue signal AN1 and the second analogue signal AN2 of the multi-channel A/D converter 124 in FIG. 2.

The step S411c following the step S411b is a determination step where it is determined whether or not the value of the voltage ratio V1/V2 calculated in the step S411b coincides with any one of the numerical values 0.211 through 0.651 represented in the lowest row of FIG. 3B or FIG. 3C, with an error range of, for example, ±1%; in the case where the value of the voltage ratio V1/V2 coincides with any one of the numerical values 0.211 through 0.651, the result of the determination becomes "YES", and then, the step S411c is followed by the step S412; in the case where the value of the voltage ratio V1/V2 coincides with none of the numerical values 0.211 through 0.6.51, the result of the determination becomes "NO", and then, the step S411c is followed by the step S415b.

The step S412 is a step in which it is determined whether or not the value of the voltage ratio V1/V2 calculated in the step S411b coincides with any one of the numerical values 0.571 through 0.651 represented in the lowest row of FIG. 3B, with an error range of, for example, ±1%, and in the case where the voltage ratio V1/V2 coincides with any one of the numerical values 0.571 through 0.651, it is determined that the lock switch 906 is opened, and in which it is determined whether or not the value of the calculated voltage ratio (V1/V2) coincides with any one of the numerical values 0.211 through 0.444 represented in the lowest row of FIG. 3C, with an error range of, for example, ±1%, and in the case where the voltage ratio (V1/V2) coincides with any one of the numerical values 0.211 through 0.444, it is determined that the lock switch 906 is closed.

The step S413 following the step S412 is a step where the resistance value R904 of the first resistor 904 corresponding to the value of the voltage ratio (V1/V2) calculated in the step S412 is calculated and determined; for example, when the value of (V1/V2) is 0.595, the lock switch 906 is off and then [R904=600Ω] is determined; when the value of (V1/V2) is 0.348, the lock switch 906 is on and then [R904=800Ω] is determined.

Then, in accordance with the value of the calculated resistance value R904, the type of the charging cable 900A is determined, and charging control of the main battery 300 is implemented with an electric current that is, for example, the same as or smaller than the maximum charging current, which is determined in accordance with the type; each of the steps S412 and S413 is a resistance value detection means.

The step S414a is a determination step; in the case where the value of the main power source voltage Vaa obtained from the main battery 300 is the same as or smaller than a predetermined value and charging is desired, the result of the determination becomes "YES" and then the step S414a is followed by the step S414b; in the case where the main battery 300 is fully charged, the result of the determination becomes "NO", and then, the step S414a is followed by the step S415b. In practice, the step is configured in such a way that in the case where the main battery 300 is not fully charged, the result of the determination becomes "YES" and charging is started, and when as a result of the charging, the main battery 300 is fully charged, the result of the determination becomes "NO" and the charging is completed.

The step S414b is a determination step; in the case where the AC voltage detection circuit 116 FIG. 2 generates the AC voltage detection signal Vae and the AC voltage obtained through the charging cable 900A is the same as or larger than a predetermined threshold-value AC voltage, the result of the determination becomes "YES" and then the step S414b is followed by the step S414c; in the case where the AC voltage is not the same as or larger than the predetermined threshold-value AC voltage, the result of the determination becomes "NO", and then, the step S414b is followed by the step S415b.

The step S414c is a determination step; when the lock release button is pressed and hence the state of the lock switch 906 changes from on to off, the result of the determination becomes "YES", and then, the step S414c is followed by the step S415b; in the case where the state of the lock switch 906 does not change, the result of the determination becomes "NO", and then, the step S414c is followed by the step S414d.

The step S414d is a determination step; when the power-supply plug 903 is completely inserted into the vehicle-side charging plug 190 and hence the state of the lock switch 906 changes from off to on, the result of the determination becomes "YES", and then, the step S414d is followed by the step S415a; in the case where the state of the lock switch 906 does not change, the result of the determination becomes "NO", and then, the step S414d is followed by the step S414e.

The step S414e is a determination step where it is determined whether or not the elapsed time from a time point when due to the generation of the connection detection signal STA in the step S401 in FIG. 4A, the microprocessor BCU of the charge control apparatus 121 is started to a time point when it is determined in the step S414d that the lock switch 906 has been closed exceeds, for example, several hundred milliseconds; in the case where the closing operation is delayed, the result of the determination becomes "YES", and then, the step S414e is followed by the step S415b; in the case where the elapsed time has not exceeded, for example, several hundred milliseconds, the result of the determination becomes "NO", and then, the step S414e is followed by the step S420.

In the step S415a, because the result of the determination in the step S414d becomes "YES" and hence it is determined that the lock switch 906 has been closed, the charging relay driving output DRV is generated; the electromagnetic coils M1u, M1d, M2u, and M2d in FIG. 2 are driven; thus, charging of the main battery 300 from the ground power source is started by way of the charging contactors 190u and 190d, the charging electric power conversion circuit 120, and the traveling contactors 180u and 180d in FIG. 1, and the output voltage of the charging electric power conversion circuit 120 starts to charge the auxiliary battery 301 by way of the step-down charging apparatus 302.

In the case where the determination in the step S407a in FIG. 4A becomes "YES" and hence the microprocessor BCU of the charge control apparatus 121 is started, there is continued charging of the auxiliary battery 301 with the charging relay driving output DRV in the step S415a in FIG. 4B instead of the direct charging command output DDV from the direct power supply device 115a.

The step S416a following the step S415a is a charging control step where while monitoring the charging current for the main battery 300, the microprocessor BCU of the charge control apparatus 121 adjusts the output voltage of the charging electric power conversion circuit 120; the charging control for the auxiliary battery 301 is performed by the step-down charging apparatus 302.

In the step S417a following the step S416a, the display command signal DSP for intermittently lighting the cable-side power-source indicator 907 or the vehicle-side power-source indicator 197 is generated; the display command signal DSP changes in accordance with several-step lighting modes in such a way that it is made possible that when, for example, the charging current for the main battery 300 is large, the conduction rate is enlarged so that the degree of charging can be observed.

The step S415b is a step that is implemented when it is determined in the step S411c that the resistance value R904 of the first resistor 904 is not appropriate, when it is determined in the step S414a that the main battery 300 has been fully charged, when it is determined in the step S414b that no appropriate AC power source voltage is obtained through the charging cable 900A, when it is determined in the step S414c that the lock switch 906 is closed, or when it is determined in the step S414e that the time during which the power-supply plug 903 is incompletely inserted is too long; the charging relay driving output DRV generated in the step S415a is stopped or in the case where the charging relay driving output DRV is stopped, this stoppage is maintained each of the steps S415a and S415b is a charging-system contactor control means.

In the step S417b following the step S415b, the display command signal DSP for blinking the cable-side power-source indicator 907 or the vehicle-side power-source indicator 197 is generated; the display command signal DSP slightly raises the lighting-time ratio or shorten the blinking period, for example, in comparison with the blinking operation on the hardware in the step S402 in FIG. 4A, so that it can be recognized that the microprocessor BCU of the charge control apparatus 121 is in operation; each of the steps S417a and S417b is a display control means as a display controller to be implemented by the microprocessor BCU of the charge control apparatus 121.

The step S418a following the step S417b is a determination step where it is determined whether or not the connection detection signal STA in FIG. 2 is still generated; the case where the connection detection signal STA is still generated, the result of the determination becomes "YES", and then, the S418a is followed by the step S418b; in the case where the connection detection signal STA has been stopped, the result of the determination becomes "NO", and then, the step S418a is followed by the step S430 in FIG. 4C by way of the relay terminal C.

The step S418b is a determination step where it is determined whether or not the main battery 300 is fully charged; in the case where the main battery 300 is fully charged, the result of the determination becomes "YES", and then, the S418b is followed by the step S430 in FIG. 4C by way of the relay terminal C; in the case where the main battery 300 is not fully charged, the result of the determination becomes "NO", and then, step S418b is followed by the operation stopping step S420.

The block step S418 consisting of the steps S418a and S418b is a transfer-to-stoppage means as a transfer-to-stoppage device; when in the step S418a, the connection detection signal STA stopped because the power-supply plug 903 has been disconnected or when in the step S418b, it is detected that the main battery 300 is fully charged, the mode of the microprocessor BCU of the charge control apparatus 121 is transferred to the stop mode.

In the operation stopping step S420, another control program is implemented; then, within a predetermined time of, for example, 5 ms, the operation starting step S410 is resumed and then the steps thereafter are recurrently implemented.

In FIG. 4C, in the step S430, which is a power source control means as a power source controller, the microprocessor BCU of the charge control apparatus 121 performs stopping processing operation and then stops the generation of the watchdog signal WDS.

In the step S431 following the step S430, the watchdog timer 123 stops the generation of the normal operation signal RUN, thereby opening the power-supply opening/closing device 601a, so that the supply of electric power to the stabilized power source 122 is stopped. In the step S432 following the step S431, when disconnection of the power-supply plug 903 is completed, the result of the determination becomes "YES", and then the initial state, represented at the top of FIG. 4A, where the cable is not connected is restored.

In this regard, however, in the step S432, when the disconnection of the power-supply plug 903 has not been completed, the result of the determination becomes "NO", and then the step S432 is followed by the step S433, where the lighting control circuit 147a in FIG. 2 makes the power-source indicator perform blinking operation. Then, in the step S434 following the step S433, when the power-source switch of the ground power source is kept closed, the result of the determination becomes "NO", and then the step S434 is followed by the step S432; when the power-source switch is turned on again, the result of the determination becomes "YES", and then the step S434 is followed by the step S435. In the step S435, the driving time limiting circuit 143 in FIG. 2 is initialized and the initial state in FIG. 4A is restored.

As is clear from, the foregoing explanation, in Embodiment 1, the driving time limiting circuit 143 in FIG. 2 limits the timing when the microprocessor ECU of the charge control apparatus 121 is started by the connection detection transistor 142a; however, in the case where the charging cable 900A is connected and the AC voltage is supplied from the ground power source and in the case where the auxiliary battery voltage Vb is normal, the connection detection transistor 142a and the starting prohibition circuit 117 always perform circuit-closing driving of the power-supply opening/closing device 601a; therefore, provided the driving time limiting circuit 143 is eliminated, the microprocessor ECU of the charge control apparatus 121 cannot be stopped under this condition.

In contrast, in the step S418 in FIG. 4B, because even when the charging cable 900A is kept connected, the operation of the microprocessor BCU of the charge control apparatus 121 is stopped when the main battery 300 becomes fully charged, the power consumption in the auxiliary battery 301 can be suppressed; however, in order to enable the above matter to be performed, it is required to make the driving time limiting circuit 143 in FIG. 2 effective.

However, in the case where under the condition that the driving time limiting circuit 143 is provided, the microprocessor BCU of the charge control apparatus 121 is stopped, the microprocessor BCU cannot be restarted unless the driving time limiting circuit 143 in FIG. 2 has been initialized; thus, as the measures therefor, the reapplication of the AC power source represented in the step S434 in FIG. 4C is implemented. In this regard, however, instead of the reapplication operation, disconnection of the power-receiving plug 901 of the charging cable 900A or temporary cancellation of the connection detection signal STA by disconnecting the power-supply plug 903 can also restart the microprocessor BCU of the charge control apparatus 121.

As is clear from the foregoing explanation, the vehicle charging apparatus according to Embodiment 1 includes the driving electric power conversion circuit 110 that supplies driving electric power from the main battery 300 mounted in a vehicle to the traveling motor 200 by way of the traveling contactors 180u and 180d, the charging electric power conversion circuit 120 that charges the main battery 300 by way of the vehicle charging contactors 190U and 190d to be connected with the charging cable 900A connected with an outer-vehicle power source or by way of a charging-system contactor including a pair of series contactors formed of the charging contactors 190u and 190u and the traveling contactors 180u and 180d, and the charging start control circuit 140A that detects the connection state of the charging cable 900A and performs opening/closing control of the charging-system contactor provided in the charging path for the main battery 300; the vehicle charging apparatus includes the vehicle electric-power conversion apparatus 100A that is supplied with controlling electric power from the auxiliary battery 301 that is charged from at least main battery 300 by way of the traveling contactors 180u and 180d and the step-down charging apparatus 302; the charging cable 900A includes the power-receiving plug 901 to be connected with the outer-vehicle power source, the power-supply plug 903 that is connected with the power-receiving plug 901 by way of the pair of power-source lines 902a and 902b and that is inserted into the vehicle-side charging plug 190, and based on at least the difference in the maximum charging current, two or more charging cables of different types are utilized; the charging cable 900A further includes the lock switch 906 that performs circuit-closing operation or circuit-opening operation when the power-supply plug 903 is completely inserted into the charging plug 190 and hence the disconnection-preventing lock mechanism works, the first resistor 904 having respective resistance values corresponding to the charging cables of two or more types, and the second resistor 905 that is connected in series with the first resistor 904 and is connected in parallel with the lock switch 906.

When the lock release button is pressed, the lock switch 906 becomes inoperative, and while the power-supply plug 903 is disconnected, the lock switch 906 becomes inoperative in circuit-opening or circuit-closing; the series circuit consisting of the first resistor 904 and the second resistor 905 is connected with the charging plug 190 from the power-supply plug 903 through the signal terminal; the charging start control circuit 140A collaborates with the charge control apparatus 121 that controls the output voltage and the output current of the charging electric power conversion unit 120; the stabilized power source 122 that is supplied with electric power by the auxiliary battery 301 by way of the power-supply opening/closing device 601a so as to generates the predetermined stabilized voltage Vcc performs power-supply driving of the charge control apparatus 121; there are provided the connection detection transistor 142a that undergoes circuit-closing driving by the auxiliary constant voltage power source 141a, which is directly supplied with electric power by the auxiliary battery 301 and generates the predetermined stabilized voltage Vdd, by way of the base resistor 142b and the series circuit consisting of the first resistor 904 and the second resistor 905, the power-supply opening/closing device 601a that undergoes circuit-closing driving when the connection detection transistor 142a is closed, and the multi-channel A/D converter 124, to which a voltage proportional to a voltage to be applied to the series circuit consisting of the first resistor 904 and, the second resistor 905 is inputted.

In the multi-channel A/D converter 124, the stabilized voltage Vcc is utilized as the driving voltage Vad for the A/D converter and as the reference voltage Vref for AD conversion; the charge control apparatus 121 includes the microprocessor BCU; the microprocessor BCU is provided with charging-system contactor control means 415a and 415b in which when a digital signal generated by the multi-channel A/D converter 124 is inputted, the resistance value of the first resistor 904 and the opening/closing state of the lock switch 906 are determined, and when the power-supply plug 903 has been inserted and hence the lock switch 906 operates, the charging-system contactor undergoes an energization drive so that charging is implemented, and when the lock release button is pressed and hence the lock switch 906 becomes inoperative, the driving of the charging-system contactor is stopped even when the charging has not been completed.

Accordingly, as the charging cable 900A, a cable that does not incorporate the charging contactors 190*u* and 190*d* and has no active device for oscillating a charging control signal can be utilized, and it is made possible that under the condition that the stabilized power source 122 that generates major control electric power is inoperative, the connection state of the charging cable 900A is detected and then the stabilized power source 122 is started; thus, there is demonstrated an effect that the power consumption in the auxiliary battery 301 at a time when the vehicle is parked can be suppressed.

The multi-channel A/D converter 124 that collaborates with the microprocessor BCU of the charge control apparatus 121 after the stabilized power source 122 has started measures the voltages in respective portions for the first resistor 904 in the charging cable 900A or the series circuit consisting of the first resistor 904 and the second resistor 905 and compares these voltages, so that the resistance values can accurately be measured; therefore, even when due to an abnormal fall of the power-source voltage of the auxiliary battery 301, the stabilized voltage Vcc is not sufficient, the resistance values can accurately be measured as long as the stabilized voltage Vcc is the same as or larger than the self-stopping voltage of the microprocessor BCU; thus, there is demonstrated an effect that no erroneous charging control is performed.

In this embodiment, the operation in which the connection detection transistor 142*a* detects whether or not the connection of the power-supply plug 903 with the vehicle-side charging plug 190 has been started is a first stage, and the operation in which the stabilized power source 122 is started and the microprocessor BCU is activated so that the opening/closing state of the lock switch 906 and the resistance value of the first resistor 904 are measured is a second stage; the first and second stages are separated from each other; as a result, in the first stage, the power consumption in the auxiliary battery 301 is minute, and in the second stage, the resistance values can accurately be measured by use of the microprocessor BCU. In the case where the state in which the charging cable 900A is connected and the microprocessor BCU is inoperative is left for a long time, there is demonstrated a prominent effect for suppressing the loss in the auxiliary battery 301; concurrently, there is demonstrated an effect that in comparison with a vehicle charging apparatus in which the resistance valued are measured without utilizing the microprocessor BCU, the resistance values can be measured in a high-accuracy manner and diverse control constants can selectively be set.

In addition, in the vehicle charging apparatus according to Embodiment 1, the stabilized voltage Vcc, which is the output voltage of the stabilized power source 122, is applied to the series circuit consisting of the first resistor 904 and the second resistor 905 by sway of the power supply diode 145*a* and the series power supply resistor 145*b*; the connection detection transistor 142*a* is supplied with electric power by way of the auxiliary constant voltage power source 141*a*; the resistance value R142*b* of the base resistor 142*b* is larger than the resistance value R145*b* of the series power supply resistor 145*b*; the first measurement voltage V1 and the second measurement voltage V2, which are the respective applied voltages at the both-end terminals of the series power supply resistor 145*b*, are inputted to the multi-channel A/D converter 124, as the first and second analogue signals AN1 and AN2 thereof. The microprocessor BCU included in the charge control apparatus 121 calculates the series combination resistance value of the first resistor 904 and the second resistor 905, with reference to the respective values of the first measurement voltage V1 and the second measurement voltage V2 and the resistance value R145*b* of the series power supply resistor 145*b*, which is a known control constant; while the first resistor 904 has a resistance value that is the same as or smaller than a predetermined value selected and determined corresponding to each of the charging cables of two or more types, the second resistor 905 is a fixed resistor having a resistance value that is larger than the maximum resistance value of the first resistor 904 and becomes a known control constant. The microprocessor BCU of the charge control apparatus 121 further includes the resistance value detection means 412 and 413 in which depending on whether the calculated resistance value of the series combination resistance is larger or smaller than the resistance value R905 of the second resistor 905, it is determined that the lock switch 906 is opened or closed, in which when the lock switch 906 is opened, the resistance value R904 of the first resistor 904 is calculated by subtracting the resistance value R905 of the second resistor 905 from the calculated value of the series combination resistance, and in which the lock switch 906 is closed, it is determined that the calculated value of the series combination resistance is the resistance value R904 of the first resistor 904.

As described above, the stabilized voltage Vcc is applied to the series circuit consisting of the first resistor 904 and the second resistor 905 provided in the charging cable 900A, by way of the power supply diode 145*a* and the series power supply resistor 145*b*; the respective applied voltages at the both-end terminals of the series power supply resistor 145*b* are inputted to the microprocessor BCU included in the charge control apparatus 121, by way of the multi-channel A/D converter 124; the connection detection transistor 142*a* is supplied with electric power by way of the auxiliary constant voltage power source 141*a*, and the resistance value R142*b* of the base resistor 142*b* thereof is larger than the resistance value R145*b* of the series power supply resistor.

While the first resistor 904 has a resistance value that is the same as or smaller than a predetermined value selected and determined corresponding to each of the charging cables of two or more types, the second resistor 905 is a fixed resistor having a resistance value that is larger than the maximum resistance value of the first resistor 904 and becomes a known control constant; through the above configuration, it is determined whether or not the second resistor 905 is short-circuited by the lock switch 906, then, the resistance value of the first resistor 904 is detected.

Accordingly, when the microprocessor BCU measures the resistance value of the first resistor 904, the stabilized voltage Vcc is applied to the series circuit consisting of the first resistor 904 and the second resistor 905; when the value of the resistance value R142*b* is set to be, for example, 10 times as large as or more than the value of the resistance value R145*b*, the current that flows from the auxiliary constant voltage power source 141*a* into the first resistor 904 becomes minute; thus, there is demonstrated a characteristic that only by measuring the respective applied voltages at the both-end terminals of the series power supply resistor 145*b*, it is made possible to accurately calculate the resistance value without undergoing the effect of a change in the power-source voltage. When the charging cable 900A is not connected, the load current of the auxiliary constant voltage power source 141*a* does not produced, and even when the charging cable 900A is connected, the base current and the collector current of the connection detection transistor 142a are minute; thus, there is demonstrated a characteristic that the power consumption in the auxiliary battery 301 at a time when the charging is not implemented can be suppressed.

In the vehicle charging apparatus according to Embodiment 1, the microprocessor BCU the charge control apparatus 121 collaborates with the watchdog timer 123 so as to generate the normal operation signal RUN; there is provided the power source control means 411a and 430 in which when the microprocessor BCU completes its control operation so as to stop the watchdog signal WDS, the normal operation signal RUN is stopped; the power-supply opening/closing device 601a undergoes circuit-closing driving at least when the connection detection transistor 142a is closed and also when the normal operation signal RUN is generated; the self-holding power supply for the stabilized power source 122 is implemented by way of the power-supply opening/closing device 601a; the charging start control circuit 140A further includes the starting prohibition circuit 117 for the AC voltage detection circuit 116 and the stabilized power source 122; the AC voltage detection circuit 116 is to generate the electrically insulated AC voltage detection signal Vae when an AC power source voltage obtained from the power-source lines 902a and 902b by way of the power-supply plug 903 and the charging plug 190 is the same as or larger than a predetermined threshold-value AC voltage; the starting prohibition circuit 117 collaborates with the connection detection transistor 142a and permits circuit-closing driving of the power-supply opening/closing device 601a at least when the AC voltage detection signal Vae is generated.

As described above, the charging start control circuit 140A further includes the starting prohibition circuit 117 for the AC voltage detection circuit 116 and the stabilized power source 122; the starting prohibition circuit 117 collaborates with the connection detection transistor 142a, and when the AC voltage obtained through the charging plug 190 is the same as or lower than a predetermined threshold voltage, the starting prohibition circuit 117 prohibits power supply to the stabilized power source 122 so as to prohibit the microprocessor BCU of the charge control apparatus 121 from being started.

As a result, in the case where under the active-line state where the charging cable 900A is connected with the ground power source, the charging cable 900A is connected with the vehicle-side charging plug 190, the stabilized power source 122 is started as the contact of the charging plug 190 starts, so that the microprocessor BCU of the charge control apparatus 121 determines the resistance value of the first resistor 904 and the opening/closing state of the lock switch 906; in the case where the lock switch 906 has already been activated, power-supply driving of the charging-system contactor is implemented. In the case where while not connected with the ground power source, the charging cable 900A is connected with the vehicle-side charging plug 190, the microprocessor BCU of the charge control apparatus 121 is inoperative, even when the contact of the charging plug 190 starts and then is completed and hence the lock switch 906 becomes operative; thus, the determination on the resistance value of the first resistor 904 and the opening/closing state of the lock switch 906 is not implemented, and the operation of the stabilized power source 122 is being waited.

When in this situation, the power-source switch of the ground power source is turned on, the stabilized power source 122 is started; then, the microprocessor BCU determines the resistance value of the first resistor 904 and the opening/closing state of the lock switch 906, so that power-supply driving of the charging-system contactor is implemented. Accordingly, regardless of whether the charging cable 900A is in the active-line state or in the inactive-line state, the charging-system contactor undergoes the circuit-closing driving after the connection of the charging cable 900A has been completed; therefore, there are demonstrated characteristics that no energization is implemented during insertion of the power-receiving plug 901 or the power-supply plug 903 and that the stabilized power source 122 is prevented from being unnecessarily activated so that the power consumption can be suppressed. When the power-receiving plug 901 or the power-supply plug 903 is disconnected, it is required to press the lock release button so that the lock switch 906 becomes inoperative; thus, because the charging-system contactor is deenergized and opened, the disconnection operation during energization cannot be implemented.

In the vehicle charging apparatus according to Embodiment 1, the charging-system contactor is formed of a pair of series contactors including the charging contactors 190u and 190d and the traveling contactors 180u and 180d; an AC voltage from the ground power source is applied to the charging electric power conversion circuit 120 by way of the charging contactors 190u and 190d, and when the charge control apparatus 121 is inoperative, the charging electric power conversion circuit 120 generates a predetermined DC voltage VDC obtained by electrically insulating and rectifying the AC voltage; the charging start control circuit 140A further includes the lower limit voltage detection circuit 113 for the auxiliary battery voltage Vb and the direct power supply device 115a for the charging contactors 190u and 190d; the lower limit voltage detection circuit 113 is a comparison circuit that operates when the connection detection transistor 142a is closed, and generates the DC voltage detection signal Vbe when the auxiliary battery voltage Vb is the same as or larger than a predetermined threshold-value DC voltage; the predetermined threshold-value DC voltage is a voltage between the second voltage Vb2 of the auxiliary battery voltage Vb, which is required for the stabilized power source 122 to generate the stabilized voltage Vcc, and the first voltage Vb1 of the auxiliary battery voltage Vb, which is required for the stabilized power source 122 to generate the power-source reset voltage Vrst (Vrst<Vcc) for the microprocessor BCU (in this regard, however, Vb1<Vb2); the microprocessor BCU performs control operation at a power-source voltage that is the same as or larger than the power-source reset voltage Vrst; each of the predetermined threshold-value AC voltage related to the AC voltage detection circuit 116 and the predetermined DC voltage VDC is a voltage the same as or larger than a minimum voltage that makes it possible that the step-down charging apparatus 302 charges the auxiliary battery 301; the starting prohibition circuit 117 performs closing operation when both the DC voltage detection signal Vbe and the AC voltage detection signal Vae are generated; the direct power supply device 115a is an opening/closing device that operates so as to perform circuit-closing driving of the charging contactors 190u and 190d, when it is detected that due to the AC voltage detection signal Vae, the AC power source voltage is applied and when the AC power source voltage is so low that the lower limit voltage detection circuit 113 does not generate the DC voltage detection signal Vbe; the circuit-closing time of the direct power supply device 115a is limited by the charging time limiting circuit 115b.

As described above, the charging-system contactor is formed of a pair of series contactors including the charging contactors 190u and 190d and the traveling contactors 180u and 180d; the charging start control circuit 140A further includes the direct power supply device 115a that operates so as to perform circuit-closing driving of the charging contactors 190u and 190d, when due to the voltage detection signal Vae, the AC power source voltage is detected and the auxiliary battery voltage is a low voltage that does not make the DC voltage detection signal Vbe generated; the circuit-closing time of the direct power supply device 115a is limited by the charging time limiting circuit 115b.

Accordingly, there is demonstrated a characteristic that in the case where when the auxiliary battery voltage Vb abnormally falls and the microprocessor BCU of the charge control apparatus 121 cannot perform control operation, the circuit-closing driving of the charging contactors 190u and 190d can be implemented by the auxiliary battery 301, the auxiliary battery 301 can be charged by way of the charging electric power conversion circuit 120 and the step-down charging apparatus and the microprocessor BCU starts its control operation as the auxiliary battery voltage rises, so that the normal state can be restored.

In the charging of the auxiliary battery 301 by the direct power supply device 115a, because the microprocessor BCU is inoperative, the closing state of the lock switch 906 is not ascertained. As the measures therefor, after it is ascertained that the connection detection transistor 142a is being closed, the auxiliary battery 301 is charged, and the charging time is limited to a short time for waiting until the voltage of the auxiliary battery 301 rises due to the application of the receiving voltage.

In the vehicle charging apparatus according to Embodiment 1 the microprocessor BCU of the charge control apparatus 121 starts its control operation at least when the connection detection transistor 142a is closed, and continues the control operation until the charging is completed and then the charging-system contactor is opened or until the power-supply plug 903 is disconnected and hence the connection detection transistor 142a is opened; a power-source indicator, which is the cable-side power-source indicator 907 or the vehicle-side power-source indicator 197, is provided at the power-supply plug 903 or at the charging plug 190; the charging start control circuit 140A is further provided with the lighting control circuit 147a for the power-source indicator; when the microprocessor BCU is inoperative and the connection detection transistor 142a is closed, the lighting control circuit 147a generates a low-frequency or narrow-width-pulse flickering output, and when the direct power supply device 115a is closed, the lighting control circuit 147a generates a continuous-mode lighting output so as to perform flickering or lighting driving of the power-source indicator; the microprocessor BCU is provided with the display control means 417a and 417b in which in the time period during which the display command signal DSP for performing power-supply driving of the power-source indicator is generated, the connection detection transistor 142a is closed, and the charging-system contactor is opened, the microprocessor BCU issues an intermittent operation command and in which in the time period during which circuit-closing driving is applied to the charging-system contactor, the microprocessor BCU generates an intermittent driving command signal, having a multi-step conduction duty rate or frequency, that responds to the charging state of the auxiliary battery 301.

As described above, a power-source indicator, which is the cable-side power-source indicator 907 or the vehicle-side power-source indicator 197, is provided at the power-supply plug 903 or at the charging plug 190; the lighting control circuit 147a, which operates when the charging cable 900A is connected and the microprocessor BCU of the charge control apparatus 121 is inoperative, performs flickering or lighting driving of the power-source indicator. The power-supply opening/closing device 601a provided in the power supply circuit of the stabilized power source 122, which drives the microprocessor BCU of the charge control apparatus 121, performs self-holding operation in response to the normal operation signal that is generated when the microprocessor BCU is normally working; the display command signal DSP to be generated by the microprocessor BCU performs on/off-drive of the power-source indicator when the charging cable 900A is connected and the charging-system contactor is opened, and performs continuous driving or intermittent driving of the power-source indicator when the charging cable 900A and the charging-system contactor is closed.

Accordingly, lighting control of the power-source indicator, which corresponds to the charging state of the auxiliary battery 301, is performed by the microprocessor BCU, and after the microprocessor BCU stops, the lighting control circuit 147a configured with simple hardware performs flickering or lighting control; thus, there is demonstrated a characteristic that there can be determined the connection state of the charging cable 900A and whether or not charging is being implemented and hence the power consumption is suppressed.

In the vehicle charging apparatus according to Embodiment 1, when the stabilized power source 122 is supplied with electric power from the auxiliary battery 301 by way of the power-supply opening/closing device 601a, which responds to the driving time limiting circuit 143 connected in series with the connection detection transistor 142a and the starting prohibition circuit 117, and hence generates the stabilized voltage Vcc, the microprocessor ECU of the charge control apparatus 121 is activated; the starting prohibition circuit 117 is turned on at least when the AC voltage detection circuit 116 generates the AC voltage detection signal Vae, so that a starting permission state occurs; in a predetermined time period after both the connection detection transistor 142a and the starting prohibition circuit 117 have closed, the driving time limiting circuit 143 becomes closed and can continue to perform circuit-closing driving of the power-supply opening/closing device 601a at least until the normal operation signal RUN is generated; the microprocessor ECU is further provided with the transfer-to-stoppage means 418 in which the charging current and the charging voltage for the main battery 300 are monitored and it is determined whether or not the charging state has reached an appropriate state and in which when the appropriate charging state is reached and hence the charging-system contactor opened, microprocessor ECU stops the watchdog signal WDS so as to autonomously stop, even when the power-supply plug 903 is not disconnected and the connection detection transistor 142a operates.

As described above, the starting prohibition circuit 117 and the driving time limiting circuit 143 are connected with the connection detection transistor 142a for starting the power source circuit of the microprocessor BCU of the charge control apparatus 121; when the main battery 300 reaches the appropriate charging state under the condition that the microprocessor BCU is started and the self-holding power supply is performed due to the normal operation signal RUN, the normal operation signal RUN stops even when the power-supply plug 903 is not disconnected, and the self-holding power supply circuit is shut down, so that the microprocessor BCU stops its operation.

Accordingly, when the main battery 300 reaches the appropriate charging state, the stabilized power source 122 and the microprocessor BCU of the charge control apparatus 121 stop regardless of the insertion/disconnection state of the power-supply plug 903; thus, there is demonstrated a characteristic that the power consumption in the auxiliary battery 301 at a time when the state where the power-supply plug 903 is inserted is left for a long time can be suppressed. When after the charging has been completed, the power-supply plug 903 is left inserted, the base current flows in the connection detection transistor 142a by way of the first resistor 904 in the charging cable 900A; in the case where a power-source indicator is provided, the power-source indicator performs blinking operation thereby consuming minute electric power; however, the blinking operation can urge that the charging cable 900A is disconnected.

Embodiment 2

Next, a vehicle charging apparatus according to Embodiment 2 will be explained based on FIGS. 5 through 8.

Figure 5:
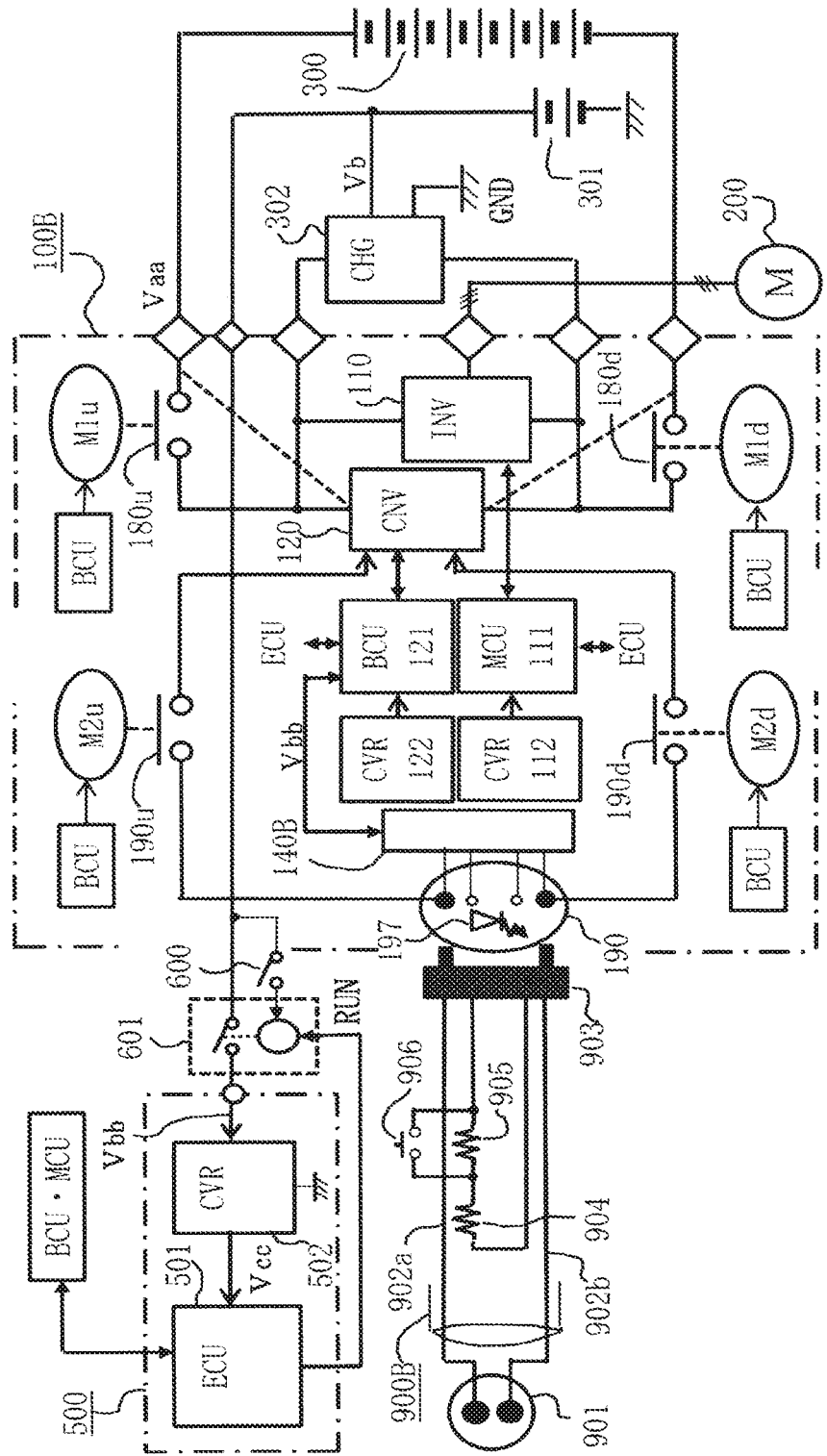
FIG. 5 is a whole-circuitry block diagram representing a vehicle charging apparatus according to Embodiment 2.

With reference to FIG. 5, which is the whole-circuitry block diagram of a vehicle charging apparatus, and FIG. 6, which is the detailed circuit diagram mainly including the charging start control circuit, the configuration thereof will be explained in detail, mainly in terms of the respective differences from those in FIG. 1 and FIG. 2.

In each of the drawings, the same reference characters denote the same or equivalent constituent elements; the vehicle electric-power conversion apparatus 100A is replaced by a vehicle electric-power conversion apparatus 100B; the charging start control circuit 140A is replaced by a charging start control circuit 140B; the charging cable 900A is replaced by a charging cable 900B; the capital English letter in the last position of each of the reference characters denote the distinction between the embodiments.

Figure 6:
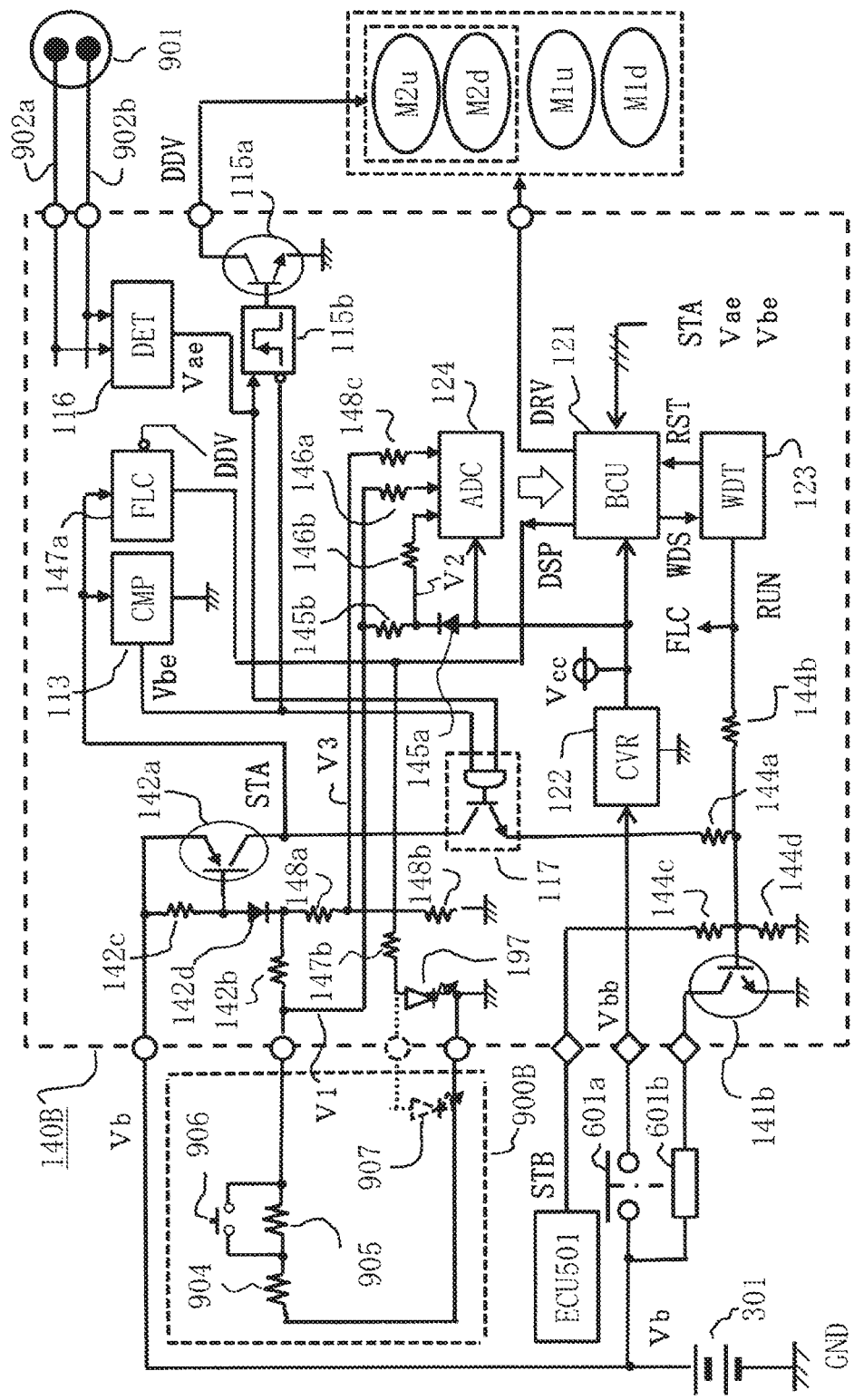
FIG. 6 is a circuit configuration diagram mainly representing a charging start control circuit to be utilized in the vehicle charging apparatus according to Embodiment 2.

In FIG. 5, the first difference from FIG. 1 is that the charging start control circuits 140A and 140B of different types, which are represented in FIGS. 2 and 6, are applied to FIGS. 1 and 5, respectively; the charging start control circuit 140B will be described in detail with reference to FIG. 6. The second difference is the following: in the case of FIG. 1, the cable-side power-source indicator 907 is provided in the charging cable 900A, and it may be allowed that, instead of this, the vehicle-side power-source indicator 197 (refer to FIG. 2) is provided at the vehicle side; however, in the case of FIG. 5, the vehicle-side power-source indicator 197 is provided at the vehicle side, and it is allowed that, instead of this, the cable-side power-source indicator 907 (refer to FIG. 6) is provided in the charging cable 900B.

Next, the configuration of FIG. 6, which is a detailed circuit diagram mainly representing the charging start control circuit 140B represented in FIG. 5, will be explained in detail.

In FIG. 6, the first difference from FIG. 2 is the following: the connection detection transistor 142a in FIG. 2 is supplied with electric power by the auxiliary battery 301 by way of the auxiliary constant voltage power source 141a; in contrast, the connection detection transistor 142a in FIG. 6 is directly supplied with electric power by the auxiliary battery 301, and the auxiliary constant voltage power source 141a is not utilized. As a result, the connection detection device 114a, which is connected with the downstream side of the lower limit voltage detection circuit 113 in FIG. 2, is not required; thus, in FIG. 6, the connection detection transistor 142a is connected with the upstream side of the lower limit voltage detection circuit 113.

Moreover, the lighting control circuit 147a in FIG. 2 is supplied with electric power by the auxiliary constant voltage power source 141a by way of the connection detection transistor 142a; however, in FIG. 6, the lighting control circuit 147a is supplied with electric power by the auxiliary battery 301 by way of the connection detection transistor 142a.

Figure 7:
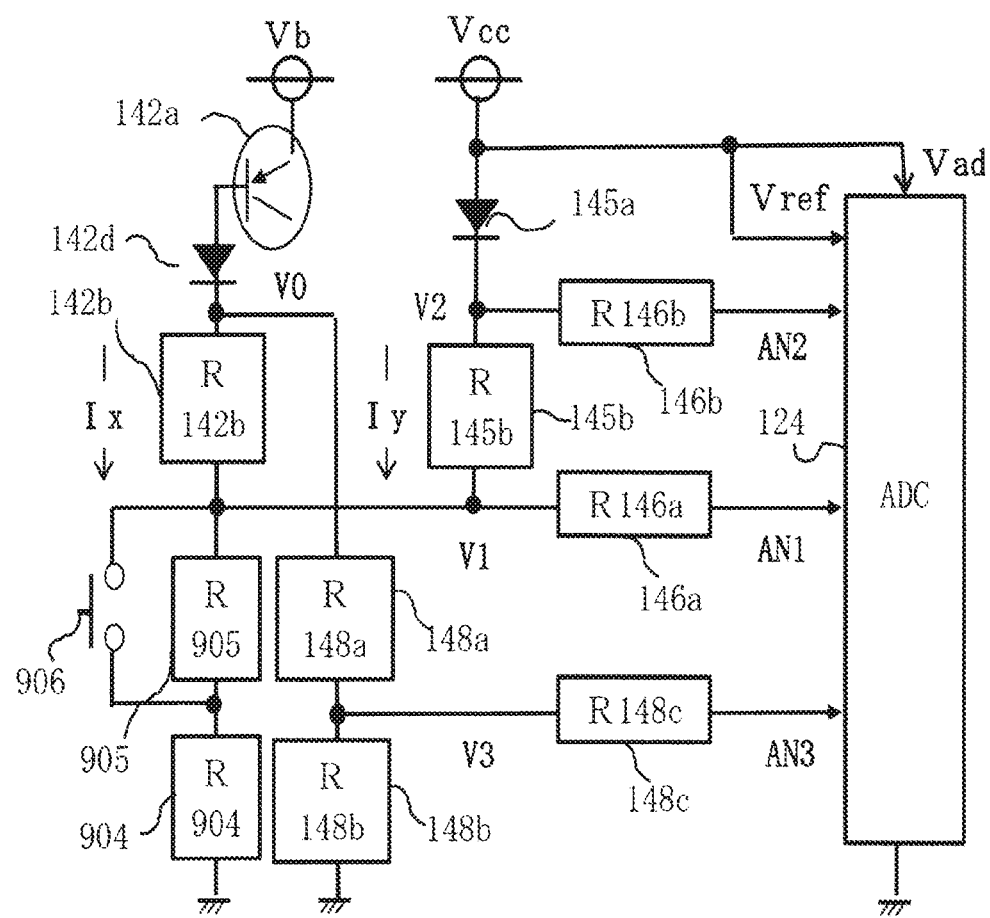
FIG. 7 is a circuit diagram representing a voltage detection unit in the vehicle charging apparatus according to Embodiment 2.

In FIG. 6, the second difference from FIG. 2 is the following: the respective electric potentials at the both ends of the series power supply resistor 145b are inputted, as the first analogue signal AN1 and the second analogue signal AN2, to the multi-channel A/D converter 124 in FIG. 2; however, in addition to those electric potentials, a third analogue signal AN3 for monitoring the auxiliary battery voltage Vb is provided to the multi-channel A/D converter 124 in FIG. 6; the detail thereof will be explained with reference to FIG. 7.

Next, FIG. 7, which is a local-portion detailed circuit diagram representing the voltage detection unit in FIG. 6, will be explained in detail.

In FIG. 7, the first resistor 904 whose resistance value is R904 and the second resistor 905 whose resistance value is R905 are connected in series with each other; the auxiliary battery voltage Vb of, for example, DC 6V through 115V generated by the auxiliary battery 301 is applied across the first resistor 904 and the second resistor 905, by way of the diode 142d and the base resistor 142b, the resistance value of which is R142b, included in the base circuit of the connection detection transistor 142a. A base voltage V0, which is the upstream electric potential of the base resistor 142b, is divided by the voltage dividing resistors 148a and 148b so as to become a third measurement voltage V3; the third measurement voltage V3 is inputted, as the third analogue signal AN3, to the multi-channel A/D converter 124 by way of a third input resistor 148c whose resistance value is R148c.

The stabilized voltage Vcc of, for example, DC 5V generated by the stabilized power source 122 is applied across the series circuit consisting of the first resistor 904 and the second resistor 905, by way of the power supply diode 145a and the series power supply resistor 145b whose resistance value is R145b. The first measurement voltage V1, which is the negative-side electric potential of the series power supply resistor 145b, is inputted, as the first analogue signal AN1, to the multi-channel A/D converter 124 by way of the first input resistor 146a whose resistance value is R146a.

The second measurement voltage V2, which is the positive-side electric potential of the series power supply resistor 145b, is inputted, as the second analogue signal AN2, to the multi-channel A/D converter 124 by way of the second input resistor 146b whose resistance value is R146b. The stabilized voltage Vcc is applied, as the driving voltage Vad, to the power-source terminal of the multi-channel A/D converter 124; the stabilized voltage Vcc is also applied, as the reference voltage Vref, to the reference voltage terminal of the multi-channel A/D converter 124. Accordingly, when the analogue input voltage to the multi-channel A/D converter 124 becomes equal to the stabilized voltage Vcc, which is the reference voltage Vref, the digital conversion value for the analogue input voltage becomes a full-scale value.

The relationship between the base voltage V0 to be applied to the base resistor 142b and the third measurement voltage V3 obtained by dividing the base voltage V0 by the resistance values R148a and R148b of a pair of the voltage dividing resistors 148a and 148b, respectively, is given by the equation (7).

$$\alpha = V3/V0 = R148b/(R148a+R148b) \tag{7}$$

where $R142b+R905+R904 \ll R148a+R148b$.

The voltage division ratio α is a fixed control constant obtained by dividing the value of the stabilized voltage Vcc by the maximum output voltage Vbmax of the auxiliary battery 301; this prevents a voltage the same as or larger than the stabilized voltage Vcc from being inputted to the multi-channel A/D converter 124. Meanwhile, letting Ix denote a current that flows from the base resistor 142*b* to the first resistor 904 and the second resistor 905 and letting Iy denote the current that flows from the series power supply resistor 145*b* to the first resistor 904 and the second resistor 905, the equations (8) through (10) below are established.

$$Ix = (V0-V1)/R142b = (V3/\alpha - V1)/R142b \tag{8}$$

$$Iy = (V2-V1)/R145b \tag{9}$$

$$Ix + Iy = V1/(R904 - R905) \tag{10}$$

The equation (11) is obtained by synthesizing the equations (8) through (10).

$$R904 + R905 = V1/(Ix+Iy) = R142b \times R145b/[R145b \times (V3/(\alpha V1)-1) + R142b \times (V2/V1-1)] \tag{11}$$

In the equation (11), the resistance value R142*b*, the resistance value R145*b*, and the voltage division ratio α are known fixed constants; the first through third measurement voltages V1 through V3 are inputted, as the first through third analogue signals AN1 through AN3, to the multi-channel A/D converter 124, and the respective digital conversion values thereof are inputted to the microprocessor BCU of the charge control apparatus 121; therefore, the microprocessor BCU can calculate the value of the series combination resistance (R904+R905), based on these fixed constants and variable measurement values.

In the equation (11), when due to an abnormal voltage drop of the auxiliary battery voltage Vb, the output voltage of the stabilized power source 122 cannot maintain the predetermined stabilized voltage Vcc and fluctuates, the first through third measurement voltages V1 through V3 fluctuate in inverse proportion thereto; however, because the voltage ratios (V3/V1) and (V2/V1) do not fluctuate, the resistance values can accurately be measured even when the power-source voltage fluctuates.

Hereinafter, the effect and the operation of the vehicle electric-power conversion apparatus 100B in the electric-vehicle charging apparatus according to Embodiment 2, configured as illustrated in FIGS. 5 through 7, will be explained in detail.

At first, in FIGS. 5 and 6, when in the normal operation mode of the vehicle electric-power conversion apparatus 100B, the power-source switch 600 is closed, electric power is supplied to the calculation control apparatus 501 by way of the power source relay 601 and the stabilized power source 502 of the higher-hierarchy control apparatus 500 and hence the microprocessor BCU is started; after that, self-holding power supply is performed through the normal operation signal RUN generated by the microprocessor BCU and the starting command signal STB is generated so that electric power is supplied also to the stabilized power source 112 of the motor control apparatus 111 and the stabilized power source 122 of the charge control apparatus 121; then, each of the motor-control microprocessor MCU and the charge-control microprocessor BCU starts its control operation. Then, the motor control apparatus 111 controls the driving electric power conversion circuit 110 so as to apply a variable-frequency three-phase pseudo-sine wave voltage to the traveling motor 200 so that power running is performed; when the vehicle is in the inertial traveling mode or in the descending-road traveling mode, the traveling motor 200 works as an electric power generator and the motor control apparatus 111 performs regenerative charge control of the main battery 300.

In this regard, however, when the charge control apparatus 121 detects the connection state of the charging cable 900B, this information is notified to the calculation control apparatus 501 via an unillustrated serial communication circuit and the microprocessor ECU does not generate the starting command signal STB; thus, neither the microprocessor MCU nor the microprocessor BCU works based on the command from the microprocessor ECU. In contrast, in the case where even when the power-source switch 600 is opened, it is detected that the charging cable 900B is connected by the charging start control circuit 140B, electric power is supplied to the stabilized power source 122 of the charge control apparatus 121 and hence the charge-control microprocessor BCU starts its control operation.

Figure 8A:
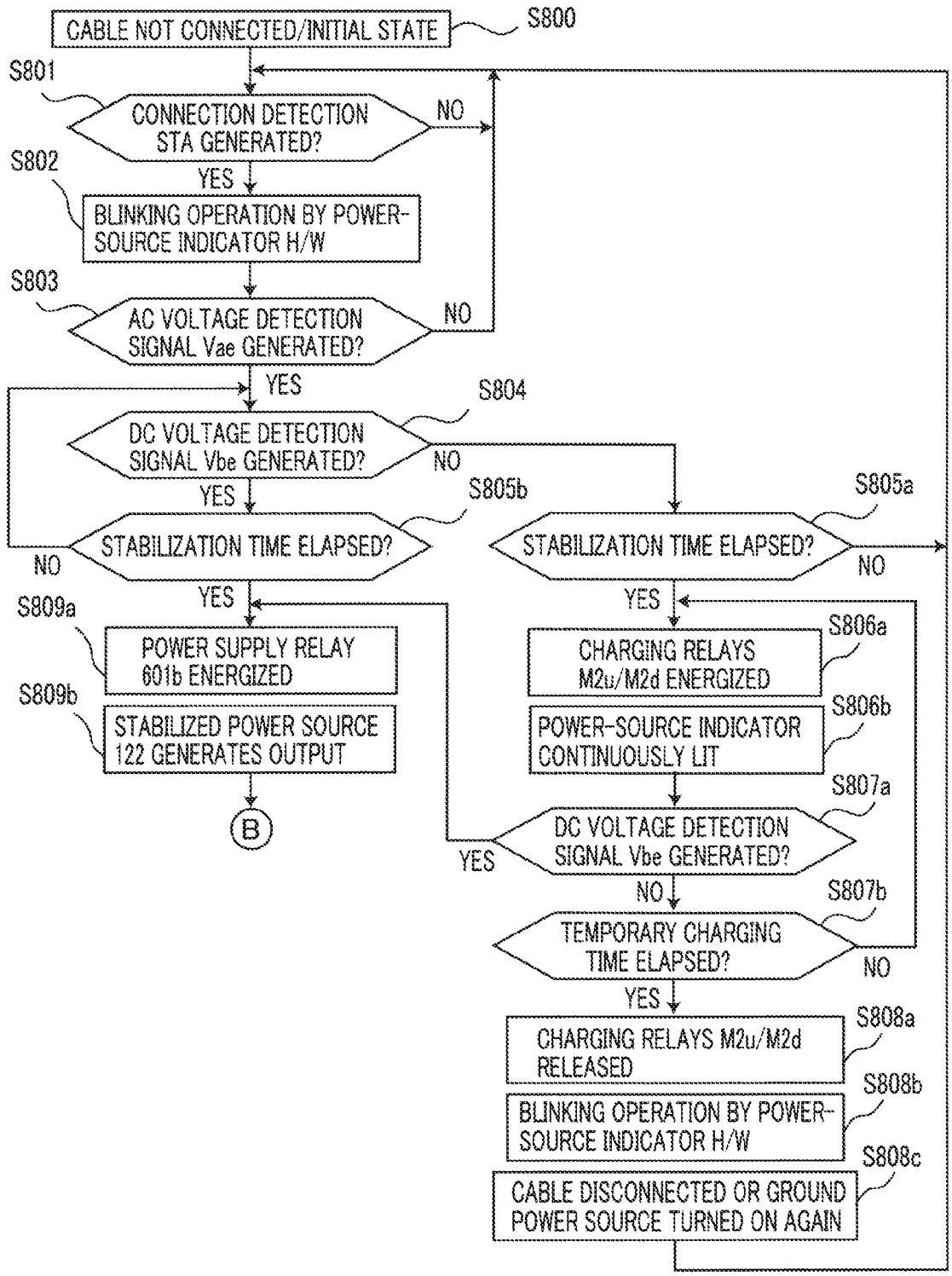
FIG. 8A is a diagram representing the first part of a flowchart for explaining the operation of the vehicle charging apparatus according to Embodiment 2.
Figure 8B:
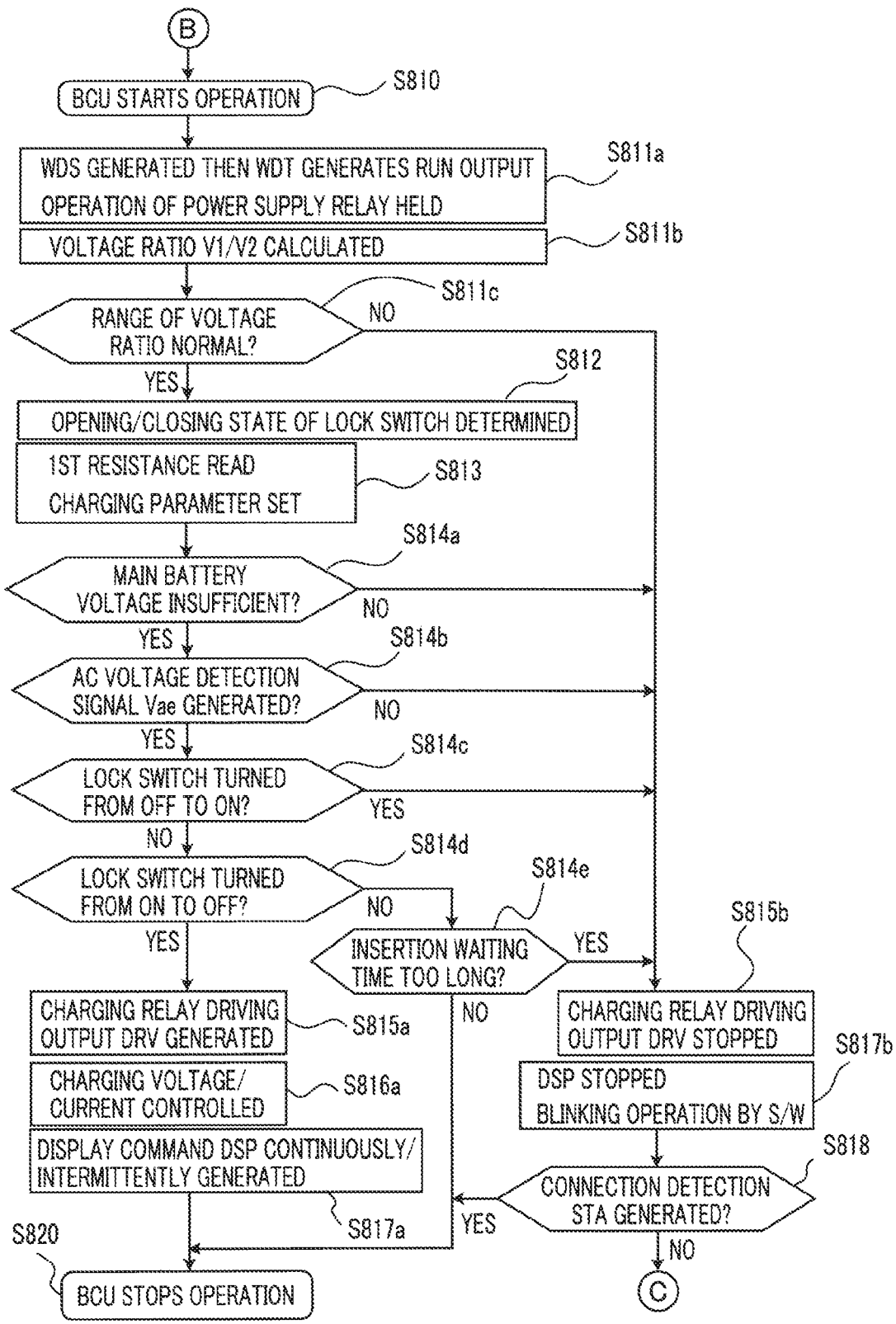
FIG. 8B is a diagram representing the second part of the flowchart for explaining the operation of the vehicle charging apparatus according to Embodiment 2.
Figure 8C:
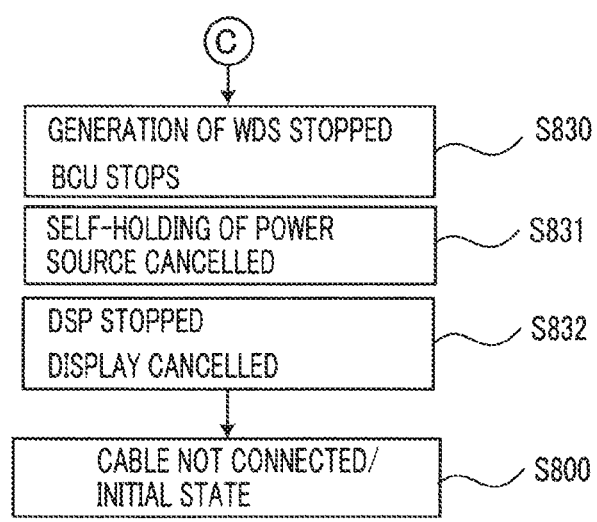
FIG. 8C is a diagram representing the third part of the flowchart for explaining the operation of the vehicle charging apparatus according to Embodiment 2.

Next, mainly with the respective differences from FIGS. 4A, 4B, and 4C, there will be sequentially explained in detail FIG. 8A, which is the front-stage portion of a flowchart for explaining the operation of the circuit configuration represented in FIG. 5 and which represents through the flowchart the control operation by the charging start control circuit 140B at a time before the charge-control microprocessor BCU operates, FIG. 8B, which is the middle-stage portion of the flowchart for explaining the operation of the circuit configuration represented in FIG. 5 and which represents through the flow chart the control operation by the charge-control microprocessor BCU itself, and FIG. 8C, which is the post-stage portion of the flowchart for explaining the operation of the circuit configuration represented in FIG. 5 and which represents through the flow chart the control operation when the charge-control microprocessor BCU stops its operation.

In FIG. 8A, the total step from the step S800 to the step S808*c* or the step S809*b* and the total step from the step S400 to the step S408*c* or the step S409*b* in FIG. 4A are equal to each other; thus, with regard to the control operation at a time before the microprocessor BCU works, there exists no difference between Embodiment 1 and Embodiment 2.

In FIG. 8B, the total step from the step S810 to the step S820 and the total step from the step S410 to the step S420 in FIG. 4B are equal to each other, except for the steps S818 and the step S418; thus, with regard to the control operation by the microprocessor BCU itself, there exists no difference between Embodiment 1 and Embodiment 2, except for the specific steps.

Explaining the specific steps in detail, in the case of FIG. 4B, the requirement that after the charging relay driving output DRV and the display command signal DSP are stopped in the step S415*b* and the step S417*b*, the operation starting step S410 is resumed via the operation stopping step S420 so that the control operation is recurrently implemented is that the connection detection signal STA has been generated and the main battery 300 is fully charged; when the connection detection signal STA has not been generated or when the main battery 300 is fully charged, the step S417*b* is followed by the step in FIG. 4C and then the microprocessor BCU stops.

However, in the case of FIG. 8B, the requirement that after the charging relay driving output DRV and the display command signal DSP are stopped in the step S815*b* and the step S817*b*, the operation starting step S810 is resumed via the operation stopping step S820 so that the control operation is recurrently implemented is only that the connection detection signal STA has been generated; even when the main battery 300 has been fully charged, the microprocessor BCU continues its control operation, as long as the connection detection signal STA is generated; when the connection detection signal STA is inoperative, the result of the determination becomes "NO" and then the step S818 is followed by the step in FIG. 8C and then the microprocessor BCU stops.

In FIG. 8C, in the step S830, which is a power source control means, the microprocessor BCU performs stopping processing operation and then stops the generation of the watchdog signal WDS. In the step S831 following the step S830, the watchdog timer 123 stops the generation of the normal operation signal RUN, so that the supply of electric power to the stabilized power source 122 is stopped. In the step S832 following the step S831, the display command signal DSP stops; at this timing, it has been detected that the connection detection signal STA had stopped in the foregoing step S818; therefore, the blinking display operation by the lighting control circuit 147a has also been stopped. Then, after the step S832, the initial step S300 in FIG. 8A is resumed.

As is clear from the foregoing explanation, in Embodiment 2, because even when the main battery 300 is fully charged, the microprocessor BCU does not stop its operation, as long as the connection detection signal STA is generated in the step S818 in FIG. 3B, it is disadvantageous configuration in terms of suppression of the power consumption in the auxiliary battery 301; however, there is demonstrated a characteristic that the driving time limiting circuit 143 represented in FIG. 2 is not required and hence the restarting processing for the microprocessor BCU, represented in FIG. 4C, is not required.

In the foregoing explanation, in Embodiment 2, three analogue input signals are inputted to the multi-channel A/D converter 124; however, even in the case of Embodiment 1, it is made possible that the electric potential at the connection point between the diode 142d and the base resistor 142b in FIG. 2 is inputted, as the base voltage V0, to the multi-channel A/D converter 124 so that the resistance value is accurately calculated. Moreover, in Embodiment 2, the driving time limiting circuit 143 in FIG. 2 of Embodiment 1 is removed; however, it is made possible that as is the case with Embodiment 1, the driving time limiting circuit 143 is added so that the control operation is also made to be the same as that in FIGS. 4B and 4C.

As is clear from the foregoing explanation, the vehicle charging apparatus according to Embodiment 2 includes the driving electric power conversion circuit 110 that supplies driving electric power from the main battery 300 mounted in a vehicle to the traveling motor 200 by way of the traveling contactors 180u and 180d, the charging electric power conversion circuit 120 that charges the main battery 300 by way of the vehicle charging contactors 190U and 190d to be connected with the charging cable 900B connected with an outer-vehicle power source or by way of a charging-system contactor including a pair of series contactors formed of the charging contactors 190u and 190u and the traveling contactors 180u and 180d, and the charging start control circuit 140B that detects the connection state of the charging cable 900B and performs opening/closing control of the charging-system contactor provided in the charging path for the main battery 300; the vehicle charging apparatus includes the vehicle electric-power conversion apparatus 100B that is supplied with controlling electric power from the auxiliary battery 301 that is charged from at least main battery 300 by way of the traveling contactors 180u and 180d and the step-down charging apparatus 302; the charging cable 900B includes the power-receiving plug 901 to be connected with the outer-vehicle power source, the power-supply plug 903 that is connected with the power-receiving plug 901 by way of a pair of power-source lines 902a and 902b and that is inserted into the vehicle-side charging plug 190, and based on the difference in the maximum charging current, two or more charging cables of different types are utilized; the charging cable 900B further includes the lock switch 906 that performs circuit-closing operation or circuit-opening operation when the power-supply plug 903 is completely inserted into the charging plug 190 and hence the disconnection-preventing lock mechanism works, the first resistor 904 having respective resistance values corresponding to the charging cables of two or more types, and the second resistor 905 that is connected in series with the first resistor 904 and is connected in parallel with the lock switch 906.

The lock switch 906 becomes inoperative when the lock release button is pressed; when the power-supply plug 903 is disconnected, the lock switch 906 is in the inoperative state of being opened or closed; the series circuit consisting of the first resistor 904 and the second resistor 905 is connected from the power-supply plug 903 to the charging plug 190 through the signal terminals; the charging start control circuit 140B collaborates with the charge control apparatus 121 that controls the output voltage and the output current of the charging electric power conversion unit 120; the stabilized power source 122 that is supplied with electric power by the auxiliary battery 301 by way of the power supply opening/closing device 601a so as to generate the predetermined stabilized voltage Vcc performs power-supply driving of the charge control apparatus 121; the charging start control circuit 140B is provided with the connection detection transistor 142a that undergoes circuit-closing driving by the auxiliary battery 301, by way of she base resistor 142b and the series circuit consisting of the first resistor 904 and the second resistor 905, the power-supply opening/closing device 601a that undergoes circuit-closing driving when the connection detection transistor 142a is closed, and the multi-channel A/D converter 124, to which a voltage proportional to a voltage to be applied to the series circuit consisting of the first resistor 904 and she second resistor 905; the stablized voltage Vcc is utilized as the driving voltage Vad for the A/D converter and as the reference voltage Vref for AD conversion in the multi-channel A/D converter 124; the charge control apparatus 121 includes the microprocessor BCU; the microprocessor BCU is provided with charging-system contactor control means 815a and 815b in which when a digital signal generated by the multi-channel A/D converter 124 is inputted, the resistance value of the first resistor 904 and the opening/closing state of the lock switch 906 are determined, and when the power-supply plug 903 has been inserted and hence the lock switch 906 operates, the charging-system contactor undergoes an energization drive, and when the lock release button is pressed and hence the lock switch 906 becomes inoperative, the driving of the charging-system contactor is stopped even when the charging has not been completed.

Furthermore, in the vehicle charging apparatus according to Embodiment 2, the stabilized voltage Vcc, which is the output voltage of the stabilized power source 122, is applied to the series circuit consisting of the first resistor 904 and the second resistor 905 by way of the power supply diode 145a and the series power supply resistor 145b; the connection detection transistor 142a is directly supplied with electric power by the auxiliary battery 301; the first measurement voltage V1 and the second measurement voltage V2, which are the respective applied voltages at the both-end terminals of the series power supply resistor 145b, are inputted to the multi-channel A/D converter 124, as the first and second analogue signals AN1 and AN2 thereof; the base voltage V0, which is applied to the base resistor 142b, is multiplied by a predetermined voltage division ratio α based on the resistance values R148a and R148b of the pair of the voltage dividing resistors 148a and 148b so as to become the third measurement voltage V3 that is inputted, as the third analogue signal AN3, to the multi-channel A/D converter 124; the voltage division ratio is a fixed control constant obtained by dividing the value of the stabilized voltage Vcc by the maximum output voltage Vbmax of the auxiliary battery 301; the microprocessor BCU included in the charge control apparatus 121 calculates the series combination resistance of the first resistor 904 and the second resistor 905, with reference to the respective values of the first measurement voltage V1, the second measurement voltage V2, and the third measurement voltage V3, the resistance value R145b of the series power supply resistor 145b, which is a known control constant, the resistance value R142b of the base resistor 142b, and the value of the voltage division ratio α; while the first resistor 904 has a resistance value that is the same as or smaller than a predetermined value selected and determined corresponding to each of the charging cables of two or more types, the second resistor 905 is a fixed resistor having a resistance value that is larger than the maximum resistance value of the first resistor 904 and becomes a known control constant; the microprocessor BCU is further provided with the resistance value detection means 812 and 813 in which depending on whether the calculated resistance value of the series combination resistance is larger or smaller than the resistance value R905 of the second resistor 905, it is determined that the lock switch 906 is opened or closed, in which when the lock switch 906 is opened, the resistance value R904 of the first resistor 904 is calculated by subtracting the resistance value R905 of the second resistor 905 from the calculated value of the series combination resistance, and in which the lock switch 906 is closed, it is determined that the calculated value of the series combination resistance is the resistance value R904 of the first resistor 904.

As described above, the stabilized voltage Vcc is applied to the series circuit consisting of the first resistor 904 and the second resistor 905 provided in the charging cable 900B, by way of the power supply diode 145a and the series power supply resistor 145b; the first measurement voltage V1 and the second measurement voltage V2, which are the respective applied voltages at the both-end terminals of the series power supply resistor 145b are inputted to the microprocessor BCU included in the charge control apparatus 121, by way of the multi-channel A/D converter 124; the connection detection transistor 142a is directly supplied with electric power by the auxiliary battery 301; the voltage applied to the base resistor 142b thereof is inputted, as the third measurement voltage V3, to the microprocessor BCU of the charge control apparatus 121 by way of the voltage dividing resistor having a predetermined voltage division ratio and the multi-channel A/D converter 124.

While the first resistor 904 has a resistance value that is the same as or smaller than a predetermined value selected and determined corresponding to each of the charging cables of two or more types, the second resistor 905 is a fixed resistor having a resistance value that is larger than the maximum resistance value of the first resistor 904 and becomes known control constant; through the above configuration, it is determined whether or not the second resistor 905 is short-circuited by the lock switch 906, then, the resistance value of the first resistor 904 is detected.

Accordingly, when the microprocessor BCU measures the resistance value of the first resistor 904, the stabilized voltage is applied to the series circuit consisting of the first resistor 904 and the second resistor 905, and the current that flows from the auxiliary battery 301 into the base resistor 142b is measured based on the third measurement voltage V3; thus, there is demonstrated a characteristic that even when the auxiliary battery voltage fluctuates, the resistance value of the first resistor 904 can accurately be calculated. When the charging cable 900B is not connected, the load current of the auxiliary battery 301 is not produced, and even when the charging cable 900B is connected, the base current and the collector current of the connection detection transistor 142a are minute; thus, there is demonstrated a characteristic that the power consumption in the auxiliary battery 301 at a time when the charging is not implemented can be suppressed.

In the vehicle charging apparatus according to Embodiment 2, the microprocessor BCU of the charge control apparatus 121 collaborates with the watchdog timer 123 so as to generate the normal operation signal RUN, and has the power source control means 811a and 830 as the power source controller in which when the microprocessor BCU completes its control operation and stops the watchdog signal WDS, the normal operation signal RUN is stopped; the power-supply opening/closing device 601a undergoes circuit-closing driving at least when the connection detection transistor 142a is closed and also when the normal operation signal RUN is generated; the self-holding power supply for the stabilized power source 122 is implemented by way of the power-supply opening/closing device 601a; the charging start control circuit 140B further includes the starting prohibition circuit 117 for the AC voltage detection circuit 116 and the stabilized power source 122; the AC voltage detection circuit 116 is to generate the electrically insulated AC voltage detection signal Vae when an AC power source voltage obtained from the power-source lines 902a and 902b by way of the power-supply plug 903 and the charging plug 190 is the same as or larger than a predetermined threshold-value AC voltage; the starting prohibition circuit 117 collaborates with the connection detection transistor 142a and permits circuit-closing driving of the power-supply opening/closing device 601a at least when the AC voltage detection signal Vae is generated.

As described above, the charging start control circuit 140B further includes the starting prohibition circuit 117 for the AC voltage detection circuit 116 and the stabilized power source 122; the starting prohibition circuit 117 collaborates with the connection detection transistor 142a, and when the AC voltage obtained through the charging plug 190 is the same as or lower than a predetermined threshold voltage, the starting prohibition circuit 117 prohibits power supply to the stabilized power source 122 so as to prohibit the microprocessor BCU from being started. Thus, there is demonstrated a characteristic the same as that of Embodiment 1.

In the vehicle charging apparatus according to Embodiment 2, the charging-system contactor is formed of a pair of series contactors including the charging contactors 190u and 190d and the traveling contactors 180u and 180d; an AC voltage from the ground power source is applied to the charging electric power conversion circuit 120 by way of the charging contactors 190u and 190d, and when the charge control apparatus 121 is inoperative, the charging electric power conversion circuit 120 generates a predetermined DC voltage VDC obtained by electrically insulating and rectifying the AC voltage; the charging start control circuit 140B further includes the lower limit voltage detection circuit 113 for the auxiliary battery voltage Vb and the direct power supply device 115a for the charging contactors 190u and 190d; the lower limit voltage detection circuit 113 is a comparison circuit that operates when the connection detection transistor 142a is closed, and generates the DC voltage detection signal Vbe when the auxiliary battery voltage Vb is the same as or larger than a predetermined threshold-value DC voltage; the predetermined threshold-value DC voltage is a voltage between the second voltage Vb2 of the auxiliary battery voltage Vb, which is required for the stabilized power source 122 to generate the stabilized voltage Vcc, and the first voltage Vb1 of the auxiliary battery voltage Vb, which is required for the stabilized power source 122 to generate the power-source reset voltage Vrst (Vrst<Vcc) for the microprocessor BCU (in this regard, however, Vb1<Vb2); the microprocessor BCU performs control operation at a power-source voltage that is the same as or larger than the power-source reset voltage Vrst; each of the predetermined threshold-value AC voltage related to the AC voltage detection circuit 116 and the predetermined DC voltage VDC is a voltage the same as or larger than a minimum voltage that makes it possible that the step-down charging apparatus 302 charges the auxiliary battery 301; the starting prohibition circuit 117 performs closing operation when both the DC voltage detection signal Vbe and the AC voltage detection signal Vae are generated; the direct power supply device 115a is an opening/closing device that operates so as to perform circuit-closing driving of the charging contactors 190u and 190d, when it is detected that due to the AC voltage detection signal Vae, the AC power source voltage is applied and when the AC power source voltage is so low that the lower limit voltage detection circuit 113 does not generate the DC voltage detection signal Vbe; the circuit-closing time of the direct power supply device 115a is limited by the charging time limiting circuit 115b As described above, the charging-system contactor is formed of a pair of series contactors including the charging contactors 190u and 190d and the traveling contactors 180u and 180d; the charging start control circuit 140B further includes the direct power supply device 115a that operates so as to perform circuit-closing driving of the charging contactors 190u and 190d, when due to the voltage detection signal Vae, the AC power source voltage is detected and the auxiliary battery voltage is so low that the DC voltage detection signal Vbe is not generated; the circuit-closing time of the direct power supply device 115a is limited by the charging time limiting circuit 115b. Thus, there is demonstrated a characteristic the same as that of Embodiment 1.

In the vehicle charging apparatus according to Embodiment 2, the microprocessor BCU of the charge control apparatus 121 starts its control operation at least when the connection detection transistor 142a is closed, and continues the control operation until the charging is completed and then the charging-system contactor is opened or until the power-supply plug 903 is disconnected and hence the connection detection transistor 142a is opened; a power-source indicator, which is the cable-side power-source indicator 907 or the vehicle-side power-source indicator 197, is provided at the power-supply plug 903 or at the charging plug 190; the charging start control circuit 140B is further provided with the lighting control circuit 147a for the power-source indicator; when the microprocessor BCU is inoperative and the connection detection transistor 142a is closed, the lighting control circuit 147a generates a low-frequency or narrow-width-pulse flickering output, and when the direct power supply device 115a is closed, the lighting control circuit 147a generates a continuous-mode lighting output so as to perform flickering or lighting driving of the power-source indicator; the microprocessor BCU is provided with the display control means 817a and 817b as the display controller in which in the time period during which the display command signal DSP for performing power-supply driving of the power-source indicator is generated, the connection detection transistor 142a is closed, and the charging-system contactor is opened, the microprocessor BCU issues an intermittent operation command and in which in the time period during which circuit-closing driving is applied to the charging-system contactor, the microprocessor BCU generates an intermittent driving command signal, having a multi-step conduction duty rate or frequency, that responds to the charging state of the auxiliary battery 301.

As described above, a power-source indicator, which is the cable-side power-source indicator 907 or the vehicle-aide power-source indicator 197, is provided at the power-supply plug 903 or at the charging plug 190; the lighting control circuit 147a, which operates when the charging cable 900B is connected and the microprocessor BCU is inoperative, performs flickering or lighting driving of the power-source indicator. The power-supply opening/closing device 601a provided in the power supply circuit of the stabilized power source 122, which drives the microprocessor ECU, performs self-holding operation in response to the normal operation signal RUN that is generated when the microprocessor ECU is normally working; the display command signal DSP to be generated by the microprocessor ECU performs intermittent driving of the power-source indicator when the charging cable 900B is connected and the charging-system contactor is opened, and performs continuous driving or intermittent driving of the power-source indicator when the charging cable 900B and the charging-system contactor is closed. Thus, there is demonstrated a characteristic the same as that of Embodiment 1.

In the vehicle charging apparatus according to Embodiment 2, when the stabilized power source 122 is supplied with electric power from the auxiliary battery 301 by way the power-supply opening/closing device 601a, which responds to the connection detection transistor 142a and the starting prohibition circuit 117, and hence generates the stabilized voltage Vcc, the microprocessor BCU of the charge control apparatus 121 is activated; the starting prohibition circuit 117 is turned on at least when the AC voltage detection circuit 116 generates the AC voltage detection signal Vae, so that a starting permission state occurs; the microprocessor BCU is further provided with the transfer-to-stoppage means 818 in which the charging current and the charging voltage for the main battery 300 are monitored and it is determined whether or not the charging state has reached an appropriate state, in which when the charging state has reached the appropriate state and hence the charging-system contactor is opened or even when the charging has not completed, the lock release button is pressed and hence the lock switch 906 becomes inoperative, in which in the case where when the charging-system contactor is opened, the power-supply plug 903 is left inserted and the connection detection transistor 142a works, the operation is maintained, and in which only when the power-supply plug 903 is disconnected and the connection detection transistor 142a is inoperative, the microprocessor BCU stops the watchdog signal WDS and then autonomously stops.

As described above, the starting prohibition circuit 117 is connected with the connection detection transistor 142a for starting the power source circuit of the microprocessor BCU of the charge control apparatus 121; there is provided a transfer-to-stoppage means 818 as a transfer-to-stoppage device in which in the case where when the microprocessor BCU is started and the self-holding power supply operation is performed based on the normal operation signal RUN, the main battery 300 reaches the appropriate charging state or in the case where even when the charging has not been completed, the lock release button is pressed and hence the lock switch 906 becomes inoperative, the power-supply plug 903 is disconnected, the microprocessor BCU stops the watchdog signal WDS and autonomously stops.

Therefore, there is demonstrated a characteristic that regardless of the charging state of the main battery 300, the control operation by the microprocessor BCU is maintained until the charging-system contactor is opened and then the power-supply plug 903 is disconnected thereby making the connection detection transistor 142a inoperative and that when the charging has not been completed and the lock switch 906 is temporarily made inoperative, the charging is readily restarted when the lock switch 906 operates again.

In the case where when the charging has been completed, the charging cable 900B is left connected, the base current flows in the connection detection transistor 142a by way of the first resistor 904 in the charging cable 900B, and when provided, a power-source indicator performs blinking operation and consumes minute electric power; however, the blinking operation can urge that the charging cable 900B is disconnected. Moreover, there is demonstrated a characteristic that because in this condition, the microprocessor BCU maintains its operation state, the microprocessor BCU can perform intermittent operation of a power-source indicator, when it is provided.

Although the present disclosure is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A vehicle charging apparatus comprising a vehicle electric-power conversion apparatus that includes a driving electric power conversion circuit that supplies driving electric power from a main battery mounted in a vehicle to a traveling motor, by way of a traveling contactor; a charging electric power conversion circuit that charges the main battery by way of vehicle charging contactors to be connected with a charging cable connected with an outer-vehicle power source or by way of a charging-system contactor including a pair of series contactors formed of the vehicle charging contactors and traveling contactors; a charging start control circuit that detects a connection state of the charging cable and performs opening/closing control of the charging contactor provided in a charging path for the main battery,
wherein the vehicle electric-power conversion apparatus is supplied with controlling electric power from an auxiliary battery that is charged from the main battery by way of the traveling contactors and a step-down charging apparatus,
wherein the charging cable includes:
a power-receiving plug to be connected with a power source outside the vehicle,
a power-supply plug that is connected with the power-receiving plug by way of a pair of power-source lines and that is inserted into a vehicle-side charging plug,
a lock switch that performs circuit-closing operation or circuit-opening operation when the power-supply plug is completely inserted into the vehicle-side charging plug,
a first resistor having a resistance value corresponding to each of charging cables of two or more types that differ from one another in a difference of a maximum charging current, and
a second resistor that is connected in series with the first resistor and is connected in parallel with the lock switch,
wherein when a lock release button is pressed, the lock switch becomes opened, and while the power-supply plug is disconnected, the lock switch becomes cannot perform circuit-opening or circuit-closing,
wherein a series circuit consisting of the first resistor and the second resistor is connected with the vehicle-side charging plug from the power-supply plug through a signal terminal,
wherein the charging start control circuit includes:
a stabilized power source that is supplied with electric power by the auxiliary battery by way of a power-supply opening/closing device so as to generate a predetermined first stabilized voltage Vcc,
a charge control apparatus that undergoes power-supply driving by the stabilized power source so as to control the charging electric power conversion circuit,
a connection detection transistor that is supplied with electric power by the auxiliary battery so as to undergo circuit-closing driving by way of the series circuit consisting of the first resistor and the second resistor,
the power-supply opening/closing device that undergoes circuit-closing driving when the connection detection transistor is closed, and
a multi-channel A/D converter, to which a voltage proportional to a voltage to be applied to the series circuit consisting of the first resistor and the second resistor is inputted, and
wherein in the multi-channel A/D converter, the predetermined first stabilized voltage Vcc is utilized as a driving voltage for the multi-channel A/D converter and as a reference voltage for AD conversion,
wherein the charge control apparatus includes a microprocessor;
when a digital signal generated from the multi-channel A/D converter is inputted to the microprocessor, the microprocessor determines the resistance value of the first resistor and an opening/closing state of the lock switch;
when the power-supply plug has completely been inserted into the vehicle-side charging plug and the lock switch is closed, the microprocessor performs circuit-closing driving of the charging-system contactor and implements charging;

when the lock switch becomes opened, the microprocessor stops driving of the charging-system contactor even when the charging has not been completed;

when the lock switch is opened, the resistance value of the first resistor is calculated by subtracting the resistance value of the second resistor from a value of a series combination resistance of the first resistor and the second resistor, and when the lock switch is closed, it is determined that the value of the series combination resistance is the resistance value of the first resistor, the resistance value of the second resistor being a known control constant and depending on whether the resistance value of the series combination resistance is larger or smaller than the resistance value of the second resistor, the microprocessor determines that the lock switch is opened or closed, respectively.

2. The vehicle charging apparatus according to claim 1, further including an auxiliary constant voltage power source that is supplied with electric power by the auxiliary battery so as to generate a predetermined second stabilized voltage, wherein the predetermined first stabilized voltage Vcc, which is an output voltage of the stabilized power source, is applied to the series circuit consisting of the first resistor and the second resistor by way of a power supply diode and a series power supply resistor; the connection detection transistor is supplied with electric power by way of the auxiliary constant voltage power source; the resistance value of a base resistor of the connection detection transistor is larger than the resistance value of the series power supply resistor; a first measurement voltage and a second measurement voltage, which are the respective applied voltages at both-end terminals of the series power supply resistor, are inputted to the multi-channel A/D converter, as first and second analogue signals thereof; the microprocessor included in the charge control apparatus calculates the series combination resistance of the first resistor and the second resistor, with reference to the respective values of the first measurement voltage and the second measurement voltage and the resistance value of the series power supply resistor, which is a known control constant; and while the first resistor has a resistance value that is the same as or smaller than a predetermined value selected and determined corresponding to each of the charging cables of two or more types, the second resistor is a fixed resistor having the resistance value that is larger than a maximum resistance value of the first resistor.

3. The vehicle charging apparatus according to claim 2, wherein the microprocessor collaborates with a watchdog timer so as to generate a normal operation signal, and has a power source controller in which when the microprocessor completes its control operation and stops a watchdog signal, the normal operation signal is stopped; the power-supply opening/closing device undergoes circuit-closing driving when the connection detection transistor is closed and also when the normal operation signal is generated, and self-holding power supply for the stabilized power source is implemented by way of the power-supply opening/closing device; the charging start control circuit includes a starting prohibition circuit for an AC voltage detection circuit and the stabilized power source; the AC voltage detection circuit generates an electrically insulated AC voltage detection signal when an AC power source voltage obtained from the pair of power-source lines by way of the power-supply plug and the vehicle-side charging plug is the same as or larger than a predetermined threshold-value AC voltage; the starting prohibition circuit collaborates with the connection detection transistor and permits circuit-closing driving of the power-supply opening/closing device when the electrically insulated AC voltage detection signal is generated.

4. The vehicle charging apparatus according to claim 3, wherein the charging-system contactor is constructed by a pair of series contactors formed of the vehicle charging contactors and the traveling contactors, wherein an AC voltage from a ground power source is applied to the charging electric power conversion circuit by way of the charging contactor, and when the charge control apparatus is inoperative, the charging electric power conversion circuit generates a predetermined DC voltage obtained by electrically insulating and rectifying the AC voltage, and wherein the charging start control circuit includes a lower limit voltage detection circuit that detects an auxiliary battery voltage from the auxiliary battery and a direct power supply device for the charging contactor; the lower limit voltage detection circuit is a comparison circuit that operates when the connection detection transistor is closed and that generates a DC voltage detection signal when the auxiliary battery voltage is the same as or larger than a predetermined threshold-value DC voltage; the predetermined threshold-value DC voltage is a voltage between a second voltage Vb2 of the auxiliary battery voltage, which is required for the stabilized power source to generate the predetermined first stabilized voltage Vcc, and a first voltage Vb1 of the auxiliary battery voltage, which is required for the stabilized power source to generate a power-source reset voltage Vrst (Vrst <Vcc) for the microprocessor (Vb1<Vb2); the microprocessor performs control operation at a power-source voltage that is the same as or larger than the power-source reset voltage Vrst; each of the predetermined threshold-value AC voltage of the AC voltage detection circuit and the predetermined DC voltage is a voltage the same as or larger than a minimum voltage that makes it possible that the step-down charging apparatus charges the auxiliary battery; the starting prohibition circuit performs closing operation when both the DC voltage detection signal and the electrically insulated AC voltage detection signal are generated; the direct power supply device is an opening/closing device that operates so as to perform circuit-closing driving of the charging contactor, when it is detected that due to the electrically insulated AC voltage detection signal, the AC power source voltage is applied, and the AC power source voltage is so low that the lower limit voltage detection circuit does not generate the DC voltage detection signal; a circuit-closing time of the direct power supply device is limited by a charging time limiting circuit.

5. The vehicle charging apparatus according to claim 4, wherein the microprocessor starts its control operation when the connection detection transistor is closed, and continues the control operation until charging is completed and then the charging-system contactor is opened or until the power-supply plug is disconnected from the vehicle-side charging plug and hence the connection detection transistor is opened; a power-source indicator, which is a cable-side power-source indicator or a vehicle-side power-source indicator, is provided at the power-supply plug or at the vehicle-side charging plug; the charging start control circuit includes a lighting control circuit for the power-source indicator, and wherein when the microprocessor is inoperative and the connection detection transistor is closed, the lighting control circuit generates a low-frequency or narrow-width-pulse flickering output, and when the direct power supply device is closed, the lighting control circuit generates a continuous-mode lighting output so as to perform flickering or lighting driving of the power-source indicator; the microprocessor includes a display controller in which in a time period during which a display command signal for performing power-supply driving of the power-source indicator is generated, the connection detection transistor is closed, and the charging-system contactor is opened, the microprocessor issues an intermittent operation command and in which in a time period during which circuit-closing driving is applied to the charging-system contactor, the microprocessor generates an intermittent driving command signal, having a multi-step conduction duty rate or frequency, that responds to a charging state of the auxiliary battery.

6. The vehicle charging apparatus according to claim 3, wherein when the stabilized power source is supplied with electric power from the auxiliary battery by way of the power-supply opening/closing device, which responds to a driving time limiting circuit connected in series with the connection detection transistor and the starting prohibition circuit, and hence generates the predetermined first stabilized voltage Vcc, the microprocessor is started; the starting prohibition circuit is turned on when the AC voltage detection circuit generates the electrically insulated AC voltage detection signal, so that a starting permission state occurs; in a predetermined time period after both the connection detection transistor and the starting prohibition circuit have closed, the driving time limiting circuit becomes closed and performs circuit-closing driving of the power-supply opening/closing device until the normal operation signal is generated; the microprocessor includes a transfer-to-stoppage device in which a charging current and a charging voltage for the main battery are monitored and it is determined whether or not a charging state has reached an appropriate state and in which when the appropriate charging state is reached and hence the charging-system contactor is opened, the microprocessor stops the watchdog signal so as to autonomously stop, even when the power-supply plug is not disconnected and the connection detection transistor operates.

7. The vehicle charging apparatus according to claim 3, wherein when the stabilized power source is supplied with electric power from the auxiliary battery by way of the power-supply opening/closing device, which responds to the connection detection transistor and the starting prohibition circuit, and hence generates the predetermined first stabilized voltage Vcc, the microprocessor is started; the starting prohibition circuit is turned on when the AC voltage detection circuit generates the electrically insulated AC voltage detection signal, so that a starting permission state occurs; the microprocessor includes a transfer-to-stoppage device in which a charging current and a charging voltage for the main battery are monitored and it is determined whether or not a charging state has reached an appropriate state, in which when the appropriate charging state is reached and hence the charging-system contactor is opened or when even though charging has not been completed, the lock release button is pressed and hence the lock switch becomes inoperative and the charging-system contactor is opened, the microprocessor continues its operation as long as the power-supply plug is left inserted and the connection detection transistor operates, and in which only when the power-supply plug is disconnected and the connection detection transistor becomes inoperative, the microprocessor stops the watchdog signal and then autonomously stops.

8. The vehicle charging apparatus according to claim 1, wherein the predetermined first stabilized voltage Vcc, which is an output voltage of the stabilized power source, is applied to the series circuit consisting of the first resistor and the second resistor by way of a power supply diode and a series power supply resistor; the connection detection transistor is directly supplied with electric power by the auxiliary battery; a first measurement voltage and a second measurement voltage, which are the respective applied voltages at both-end terminals of the series power supply resistor, are inputted to the multi-channel A/D converter, as first and second analogue signals thereof; a base voltage to be applied to a base resistor of the connection detection transistor is multiplied by a predetermined voltage division ratio α based on resistance values of a pair of voltage dividing resistors so as to become a third measurement voltage, and then is inputted, as a third analogue signal, to the multi-channel A/D converter; the predetermined voltage division ratio a is a fixed control constant obtained by dividing the value of the predetermined first stabilized voltage Vcc by a maximum output voltage of the auxiliary battery; the microprocessor included in the charge control apparatus calculates a series combination resistance of the first resistor and the second resistor, with reference to the respective values of the first measurement voltage, the second measurement voltage, and the third measurement voltage, the resistance value of the series power supply resistor, which is a known control constant, the resistance value of the base resistor, and the value of the predetermined voltage division ratio α; and while the first resistor has a resistance value that is the same as or smaller than a predetermined value selected and determined corresponding to each of the charging cables of two or more types, the second resistor is a fixed resistor having the resistance value that is larger than a maximum resistance value of the first resistor.

9. The vehicle charging apparatus according to claim 8, wherein the microprocessor collaborates with a watchdog timer so as to generate a normal operation signal, and has a power source controller in which when the microprocessor completes its control operation and stops a watchdog signal, the normal operation signal is stopped; the power-supply opening/closing device undergoes circuit-closing driving when the connection detection transistor is closed and also when the normal operation signal is generated, and self-holding power supply for the stabilized power source is implemented by way of the power-supply opening/closing device; the charging start control circuit includes a starting prohibition circuit for an AC voltage detection circuit and the stabilized power source; the AC voltage detection circuit generates an electrically insulated AC voltage detection signal when an AC power source voltage obtained from the pair of power-source lines by way of the power-supply plug and the vehicle-side charging plug is the same as or larger than a predetermined threshold-value AC voltage; the starting prohibition circuit collaborates with the connection detection transistor and permits circuit-closing driving of the power-supply opening/closing device when the electrically insulated AC voltage detection signal is generated.

10. The vehicle charging apparatus according to claim 9, wherein the charging-system contactor is constructed by a pair of series contactors formed of the vehicle charging contactors and the traveling contactors, wherein an AC voltage from a ground power source is applied to the charging electric power conversion circuit by way of the charging contactor, and when the charge control apparatus is inoperative, the charging electric power conversion circuit generates a predetermined DC voltage obtained by electrically insulating and rectifying the AC voltage, and wherein the charging start control circuit includes a lower limit voltage detection circuit that detects an auxiliary battery voltage from the auxiliary battery and a direct power supply device for the charging contactor; the lower limit voltage detection circuit is a comparison circuit that operates when the connection detection transistor is closed and that generates a DC voltage detection signal when the auxiliary battery voltage is the same as or larger than a predetermined threshold-value DC voltage; the predetermined threshold-value DC voltage is a voltage between a second voltage Vb2 of the auxiliary battery voltage, which is required for the stabilized power source to generate the predetermined first stabilized voltage Vcc, and a first voltage Vb1 of the auxiliary battery voltage, which is required for the stabilized power source to generate a power-source reset voltage Vrst (Vrst <Vcc) for the microprocessor (Vb1<Vb2); the microprocessor performs control operation at a power-source voltage that is the same as or larger than the power-source reset voltage Vrst; each of the predetermined threshold-value AC voltage of the AC voltage detection circuit and the predetermined DC voltage is a voltage the same as or larger than a minimum voltage that makes it possible that the step-down charging apparatus charges the auxiliary battery; the starting prohibition circuit performs closing operation when both the DC voltage detection signal and the electrically insulated AC voltage detection signal are generated; the direct power supply device is an opening/closing device that operates so as to perform circuit-closing driving of the charging contactor, when it is detected that due to the electrically insulated AC voltage detection signal, the AC power source voltage is applied, and the AC power source voltage is so low that the lower limit voltage detection circuit does not generate the DC voltage detection signal; a circuit-closing time of the direct power supply device is limited by a charging time limiting circuit.

11. The vehicle charging apparatus according to claim 10, wherein the microprocessor starts its control operation when the connection detection transistor is closed, and continues the control operation until charging is completed and then the charging-system contactor is opened or until the power-supply plug is disconnected from the vehicle-side charging plug and hence the connection detection transistor is opened; a power-source indicator, which is a cable-side power-source indicator or a vehicle-side power-source indicator, is provided at the power-supply plug or at the vehicle-side charging plug; the charging start control circuit includes a lighting control circuit for the power-source indicator, and wherein when the microprocessor is inoperative and the connection detection transistor is closed, the lighting control circuit generates a low-frequency or narrow-width-pulse flickering output, and when the direct power supply device is closed, the lighting control circuit generates a continuous-mode lighting output so as to perform flickering or lighting driving of the power-source indicator; the microprocessor includes a display controller in which in a time period during which a display command signal for performing power-supply driving of the power-source indicator is generated, the connection detection transistor is closed, and the charging-system contactor is opened, the microprocessor issues an intermittent operation command and in which in a time period during which circuit-closing driving is applied to the charging-system contactor, the microprocessor generates an intermittent driving command signal, having a multi-step conduction duty rate or frequency, that responds to a charging state of the auxiliary battery.

12. The vehicle charging apparatus according to claim 9, wherein when the stabilized power source is supplied with electric power from the auxiliary battery by way of the power-supply opening/closing device, which responds to a driving time limiting circuit connected in series with the connection detection transistor and the starting prohibition circuit, and hence generates the predetermined first stabilized voltage Vcc, the microprocessor is started; the starting prohibition circuit is turned on when the AC voltage detection circuit generates the electrically insulated AC voltage detection signal, so that a starting permission state occurs; in a predetermined time period after both the connection detection transistor and the starting prohibition circuit have closed, the driving time limiting circuit becomes closed and performs circuit-closing driving of the power-supply opening/closing device until the normal operation signal is generated; the microprocessor includes a transfer-to-stoppage device in which a charging current and a charging voltage for the main battery are monitored and it is determined whether or not a charging state has reached an appropriate state and in which when the appropriate charging state is reached and hence the charging-system contactor is opened, the microprocessor stops the watchdog signal so as to autonomously stop, even when the power-supply plug is not disconnected and the connection detection transistor operates.

13. The vehicle charging apparatus according to claim 9, wherein when the stabilized power source is supplied with electric power from the auxiliary battery by way of the power-supply opening/closing device, which responds to the connection detection transistor and the starting prohibition circuit, and hence generates the predetermined first stabilized voltage Vcc, the microprocessor is started; the starting prohibition circuit is turned on when the AC voltage detection circuit generates the electrically insulated AC voltage detection signal, so that a starting permission state occurs; the microprocessor includes a transfer-to-stoppage device in which a charging current and a charging voltage for the main battery are monitored and it is determined whether or not a charging state has reached an appropriate state, in which when the appropriate charging state is reached and hence the charging-system contactor is opened or when even though charging has not been completed, the lock release button is pressed and hence the lock switch becomes inoperative and the charging-system contactor is opened, the microprocessor continues its operation as long as the power-supply plug is left inserted and the connection detection transistor operates, and in which only when the power-supply plug is disconnected and the connection detection transistor becomes inoperative, the microprocessor stops the watchdog signal and then autonomously stops.

14. A vehicle charging apparatus comprising a vehicle electric-power conversion apparatus that includes a driving electric power conversion circuit that supplies driving electric power from a main battery mounted in a vehicle to a traveling motor, by way of a traveling contactor; a charging electric power conversion circuit that charges the main battery by way of vehicle charging contactors to be connected with a charging cable connected with an outer-vehicle power source or by way of a charging-system contactor including a pair of series contactors formed of the vehicle charging contactors and traveling contactors; a charging start control circuit that detects a connection state of the charging cable and performs opening/closing control of the charging contactor provided in a charging path for the main battery,
    wherein the vehicle electric-power conversion apparatus is supplied with controlling electric power from an auxiliary battery that is charged from the main battery by way of the traveling contactors and a step-down charging apparatus,
    wherein the charging cable includes:
        a power-receiving plug to be connected with a power source outside the vehicle,
        a power-supply plug that is connected with the power-receiving plug by way of a pair of power-source lines and that is inserted into a vehicle-side charging plug,
        a lock switch that performs circuit-closing operation or circuit-opening operation when the power-supply plug is completely inserted into the vehicle-side charging plug,
        a first resistor having a resistance value corresponding to each of charging cables of two or more types that differ from one another in a difference of a maximum charging current, and
        a second resistor that is connected in series with the first resistor and is connected in parallel with the lock switch,
    wherein when a lock release button is pressed, the lock switch becomes opened, and while the power-supply plug is disconnected, the lock switch cannot perform circuit-opening or circuit-closing,
    wherein a series circuit consisting of the first resistor and the second resistor is connected with the vehicle-side charging plug from the power-supply plug through a signal terminal, wherein the charging start control circuit includes:
        a stabilized power source that is supplied with electric power by the auxiliary battery by way of a power-supply opening/closing device so as to generate a predetermined first stabilized voltage Vcc,
        a charge control apparatus that undergoes power-supply driving by the stabilized power source so as to control the charging electric power conversion circuit,
        a connection detection transistor that is supplied with electric power by the auxiliary battery so as to undergo circuit-closing driving by way of the series circuit consisting of the first resistor and the second resistor,
        the power-supply opening/closing device that undergoes circuit-closing driving when the connection detection transistor is closed, and
        a multi-channel A/D converter, to which a voltage proportional to a voltage to be applied to the series circuit consisting of the first resistor and the second resistor is inputted, and
    wherein in the multi-channel A/D converter, the predetermined first stabilized voltage Vcc is utilized as a driving voltage for the multi-channel A/D converter and as a reference voltage for AD conversion,
    wherein the charge control apparatus includes a microprocessor;
    when a digital signal generated from the multi-channel A/D converter is inputted to the microprocessor, the microprocessor determines the resistance value of the first resistor and an opening/closing state of the lock switch;
    when the power-supply plug has completely been inserted into the vehicle-side charging plug and the lock switch is closed, the microprocessor performs circuit-closing driving of the charging-system contactor and implements charging;
    when the lock switch becomes opened, the microprocessor stops driving of the charging-system contactor even when the charging has not been completed,
    wherein the microprocessor collaborates with a watchdog timer so as to generate a normal operation signal, and has a power source controller in which when the microprocessor completes its control operation and stops a watchdog signal, the normal operation signal is stopped; the power-supply opening/closing device undergoes circuit-closing driving when the connection detection transistor is closed and also when the normal operation signal is generated, and self-holding power supply for the stabilized power source is implemented by way of the power-supply opening/closing device; the charging start control circuit includes a starting prohibition circuit for an AC voltage detection circuit and the stabilized power source; the AC voltage detection circuit generates an electrically insulated AC voltage detection signal when an AC power source voltage obtained from the pair of power-source lines by way of the power-supply plug and the vehicle-side charging plug is the same as or larger than a predetermined threshold-value AC voltage; the starting prohibition circuit collaborates with the connection detection transistor and permits circuit-closing driving of the power-supply opening/closing device when the electrically insulated AC voltage detection signal is generated.

15. The vehicle charging apparatus according to claim 14,
    wherein the charging-system contactor is constructed by a pair of series contactors formed of the vehicle charging contactors and the traveling contactors,
    wherein an AC voltage from a ground power source is applied to the charging electric power conversion circuit by way of the charging contactor, and when the charge control apparatus is inoperative, the charging electric power conversion circuit generates a predetermined DC voltage obtained by electrically insulating and rectifying the AC voltage, and
    wherein the charging start control circuit includes a lower limit voltage detection circuit that detects an auxiliary battery voltage from the auxiliary battery and a direct power supply device for the charging contactor; the lower limit voltage detection circuit is a comparison circuit that operates when the connection detection transistor is closed and that generates a DC voltage detection signal when the auxiliary battery voltage is the same as or larger than a predetermined threshold-value DC voltage; the predetermined threshold-value DC voltage is a voltage between a second voltage Vb2 of the auxiliary battery voltage, which is required for the stabilized power source to generate the predetermined first stabilized voltage Vcc, and a first voltage Vb1 of the auxiliary battery voltage, which is required for the stabilized power source to generate a power-source reset voltage Vrst (Vrst <Vcc) for the microprocessor (Vb1<Vb2); the microprocessor performs control operation at a power-source voltage that is the same as or larger than the power-source reset voltage Vrst; each of the predetermined threshold-value AC voltage of the AC voltage detection circuit and the predetermined DC voltage is a voltage the same as or larger than a minimum voltage that makes it possible that the step-down charging apparatus charges the auxiliary battery; the starting prohibition circuit performs closing operation when both the DC voltage detection signal and the electrically insulated AC voltage detection signal are generated; the direct power supply device is an opening/closing device that operates so as to perform circuit-closing driving of the charging contactor, when it is detected that due to the electrically insulated AC voltage detection signal, the AC power source voltage is applied, and the AC power source voltage is so low that the lower limit voltage detection circuit does not generate the DC voltage detection signal; a circuit-closing time of the direct power supply device is limited by a charging time limiting circuit.

16. The vehicle charging apparatus according to claim 15, wherein the microprocessor starts its control operation when the connection detection transistor is closed, and continues the control operation until charging is completed and then the charging-system contactor is opened or until the power-supply plug is disconnected from the vehicle-side charging plug and hence the connection detection transistor is opened; a power-source indicator, which is a cable-side power-source indicator or a vehicle-side power-source indicator, is provided at the power-supply plug or at the vehicle-side charging plug; the charging start control circuit includes a lighting control circuit for the power-source indicator, and wherein when the microprocessor is inoperative and the connection detection transistor is closed, the lighting control circuit generates a low-frequency or narrow-width-pulse flickering output, and when the direct power supply device is closed, the lighting control circuit generates a continuous-mode lighting output so as to perform flickering or lighting driving of the power-source indicator; the microprocessor includes a display controller in which in a time period during which a display command signal for performing power-supply driving of the power-source indicator is generated, the connection detection transistor is closed, and the charging-system contactor is opened, the microprocessor issues an intermittent operation command and in which in a time period during which circuit-closing driving is applied to the charging-system contactor, the microprocessor generates an intermittent driving command signal, having a multi-step conduction duty rate or frequency, that responds to a charging state of the auxiliary battery.

17. The vehicle charging apparatus according to claim 14, wherein when the stabilized power source is supplied with electric power from the auxiliary battery by way of the power-supply opening/closing device, which responds to a driving time limiting circuit connected in series with the connection detection transistor and the starting prohibition circuit, and hence generates the predetermined first stabilized voltage Vcc, the microprocessor is started; the starting prohibition circuit is turned on when the AC voltage detection circuit generates the electrically insulated AC voltage detection signal, so that a starting permission state occurs; in a predetermined time period after both the connection detection transistor and the starting prohibition circuit have closed, the driving time limiting circuit becomes closed and performs circuit-closing driving of the power-supply opening/closing device until the normal operation signal is generated; the microprocessor includes a transfer-to-stoppage device in which a charging current and a charging voltage for the main battery are monitored and it is determined whether or not a charging state has reached an appropriate state and in which when the appropriate charging state is reached and hence the charging-system contactor is opened, the microprocessor stops the watchdog signal so as to autonomously stop, even when the power-supply plug is not disconnected and the connection detection transistor operates.

18. The vehicle charging apparatus according to claim 14, wherein when the stabilized power source is supplied with electric power from the auxiliary battery by way of the power-supply opening/closing device, which responds to the connection detection transistor and the starting prohibition circuit, and hence generates the predetermined first stabilized voltage Vcc, the microprocessor is started; the starting prohibition circuit is turned on when the AC voltage detection circuit generates the electrically insulated AC voltage detection signal, so that a starting permission state occurs; the microprocessor includes a transfer-to-stoppage device in which a charging current and a charging voltage for the main battery are monitored and it is determined whether or not a charging state has reached an appropriate state, in which when the appropriate charging state is reached and hence the charging-system contactor is opened or when even though charging has not been completed, the lock release button is pressed and hence the lock switch becomes inoperative and the charging-system contactor is opened, the microprocessor continues its operation as long as the power-supply plug is left inserted and the connection detection transistor operates, and in which only when the power-supply plug is disconnected and the connection detection transistor becomes inoperative, the microprocessor stops the watchdog signal and then autonomously stops.

\* \* \* \* \*